United States Patent
Van der Auwera et al.

(10) Patent No.: US 11,057,622 B2
(45) Date of Patent: Jul. 6, 2021

(54) POSITION DEPENDENT INTRA PREDICTION COMBINATION WITH NON-SQUARE BLOCK DIAGONALS

(71) Applicant: QUALCOMM Incorporated, San Diego, CA (US)

(72) Inventors: Geert Van der Auwera, Del Mar, CA (US); Adarsh Krishnan Ramasubramonian, Irvine, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/714,432

(22) Filed: Dec. 13, 2019

(65) Prior Publication Data

US 2020/0195921 A1   Jun. 18, 2020

Related U.S. Application Data

(60) Provisional application No. 62/779,410, filed on Dec. 13, 2018.

(51) Int. Cl.
*H04N 19/11* (2014.01)
*H04N 19/176* (2014.01)

(52) U.S. Cl.
CPC .......... *H04N 19/11* (2014.11); *H04N 19/176* (2014.11)

(58) Field of Classification Search
None
See application file for complete search history.

(56) References Cited

U.S. PATENT DOCUMENTS

| 2019/0306513 | A1  | 10/2019 | Van Der Auwera et al. |
| 2020/0221084 | A1* | 7/2020  | Jang ..................... H04N 19/159 |
| 2020/0236361 | A1* | 7/2020  | Jang ..................... H04N 19/117 |

OTHER PUBLICATIONS

Zhao et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10.*

Chen J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v2, 12th Meeting: Macao, CN, Oct. 12, 2018; Doc: JVET-L1002, 48 pages.*

(Continued)

*Primary Examiner* — Edemio Navas, Jr.
(74) *Attorney, Agent, or Firm* — Shumaker & Sieffert, P.A.

(57) ABSTRACT

A video decoder configured to determine a block of video data is intra predicted using an angular intra prediction mode, wherein the angular intra prediction mode is one of a bottom-left intra prediction mode or a top-right intra prediction mode; determine an aspect ratio of the block; locate one or more reference samples corresponding to the angular intra prediction mode; apply position dependent intra prediction combination to the reference samples to determine modified reference samples based on the aspect ratio of the block; and generate a predictive block for the block based on the modified reference samples.

28 Claims, 19 Drawing Sheets

(56) References Cited

OTHER PUBLICATIONS

Bross B., et al., "Versatile Video Coding (Draft 1)," JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-d2, 43 pages.

Bross B., et al., "Versatile Video Coding (Draft 23)," JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.

Chen J., "Algorithm Description of Joint Exploration Test Model 7 (JEM7)," 119. MPEG Meeting; Jul. 17, 2017-Jul. 21, 2017; Torino; (Motion Picture Expert Group or ISO/IEC JTC1/SC29/WG11), JVET-G1001v1, No. N17055, Oct. 6, 2017, XP030023716, 48 Pages.

Chen J., et al., "Algorithm description for Versatile Video Coding and Test Model 1 (VTM 1)," Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

Ergen S., "ZigBee/IEEE 802.15.4 Summary," Sep. 10, 2004, 37 Pages.

"Guidelines for Implementations: DASH-IF Interoperability Points," Version 4.0, DASH Industry Forum, Dec. 12, 2016, 168 pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band," LAN/MAN Standards Committee of the IEEE Computer Society, Dec. 28, 2012, 628 Pages.

ITU-T H.261, Line Transmission of Non-Telephone Signals, Video Codec for Audiovisual Services at p x 64 kbits, The International Telecommunication Union, Mar. 1993, 29 pp.

ITU-T H.262 (Feb. 2000), "Information Technology—Generic Coding of Moving Pictures and Associated Audio Information: Video," Series H: Audiovisual and Multimedia Systems, Infrastructure of Audiovisual Services—Coding of Moving Video, Feb. 2000, 220 pages.

ITU-T H.263, "Video Coding for Low Bit Rate Communication," Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Said A., et al., "Position Dependent Intra Prediction Combination," Qualcomm Incorporated, International Organisation or Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 Pages.

U.S. Appl. No. 62/693,266, filed Jul. 2, 2018 and U.S. Appl. No. 62/727,341, filed Sep. 5, 2018, pp. 1-51.

U.S. Appl. No. 62/768,655, filed Nov. 6, 2018, 65 Pages.

Van Der Auwera G., et al., "Extension of Simplified PDPC to Diagonal Intra Modes," 10th JVET Meeting, Apr. 10, 2018-Apr. 20, 2018, San Diego, (The Joint Video Exploration Team of ISO/IEC JTC1/SC29/WG11 and ITU-T SG.16), JVET-J0069_r1, Apr. 2018, pp. 1-4.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

Zhao X., et al., "EE1 Related: Simplification and Extension of PDPC," 8th JVET Meeting; Oct. 18, 2017-Oct. 25, 2017; Macau; (The Joint Video Exploration Team of ISO/IEC JTC1/SC29/WG11 and ITU-T SG.16); URL: http://phenix.int-evry.fr/jvet/,,No. JVET-H005741, Oct. 11, 2017, XP030151049, cited in the application, Section 1 Proposed method, 4 pages.

\* cited by examiner

Table I

| predModeIntra |  |  |  |  |  |  |  |  |  |  |  |  |  | -14^ | -13 | -12^ | -11 |
|---|---|---|---|---|---|---|---|---|---|---|---|---|---|---|---|---|---|
| intraPredAngle |  |  |  |  |  |  |  |  |  |  |  |  |  | 512^ | 341 | 256^ | 171 |
| predModeIntra | -10^ | -9 | -8 | -7 | -6^ | -5 | -4 | -3 | -2 | -1 | 2* | 3 | 4 | 5 | 6 | 7 | 8^ |
| intraPredAngle | 128^ | 102 | 86 | 73 | 64^ | 57 | 51 | 45 | 39 | 35 | 32* | 29 | 26 | 23 | 20 | 18 | 16^ |
| predModeIntra | 9 | 10 | 11 | 12^ | 13 | 14^ | 15 | 16^ | 17 | 18# | 19 | 20^ | 21 | 22^ | 23 | 24^ | 25 |
| intraPredAngle | 14 | 12 | 10 | 8^ | 6 | 4^ | 3 | 2^ | 1 | 0# | -1 | -2^ | -3 | -4^ | -6 | -8^ | -10 |
| predModeIntra | 26 | 27 | 28^ | 29 | 30 | 31 | 32 | 33 | 34* | 35 | 36 | 37 | 38 | 39 | 40 | 41 | 42 |
| intraPredAngle | -12 | -14 | -16^ | -18 | -20 | -23 | -26 | -29 | -32* | -29 | -26 | -23 | -20 | -18 | -16 | -14 | -12 |
| predModeIntra | 43 | 44^ | 45 | 46^ | 47 | 48^ | 49 | 50# | 51 | 52^ | 53 | 54^ | 55 | 56^ | 57 | 58 | 59 |
| intraPredAngle | -10 | -8^ | -6 | -4^ | -3 | -2^ | -1 | 0# | 1 | 2^ | 3 | 4^ | 6 | 8^ | 10 | 12 | 14 |
| predModeIntra | 60^ | 61 | 62 | 63 | 64 | 65 | 66* | 67 | 68 | 69 | 70 | 71 | 72^ | 73 | 74 | 75 | 76^ |
| intraPredAngle | 16^ | 18 | 20 | 23 | 26 | 29 | 32* | 35 | 39 | 45 | 51 | 57 | 64^ | 73 | 86 | 102 | 128^ |
| predModeIntra | 77 | 78^ | 79 | 80^ |  |  |  |  |  |  |  |  |  |  |  |  |  |
| intraPredAngle | 171 | 256^ | 341 | 512^ |  |  |  |  |  |  |  |  |  |  |  |  |  |

FIG. 11

POSITION DEPENDENT INTRA PREDICTION COMBINATION WITH NON-SQUARE BLOCK DIAGONALS

This application claims the benefit of U.S. Provisional Patent Application 62/779,410 filed 13 Dec. 2018, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques related to intra prediction, which is a technique for predicting a block of video data using samples from neighboring blocks in the same picture as the block being predicted. One type of intra prediction is position dependent intra prediction combination (PDPC), which is described in more detail below. In PDPC, a video coder determines values for samples from a top reference line and a left reference line (referred to as PDPC reference samples) and uses a weighted average of the PDPC reference samples with the sample obtained from the intra prediction mode to achieve better compression efficiency. This disclosure describes techniques for controlling whether or not to perform PDPC for certain blocks of video data. The techniques of this disclosure may improve overall video coding quality and efficiency.

According to one example, a method includes determining a block of video data is intra predicted using an angular intra prediction mode, wherein the angular intra prediction mode is one of a bottom-left intra prediction mode or a top-right intra prediction mode; locating one or more reference samples corresponding to the angular intra prediction mode; determining an aspect ratio of the block; applying weights according to a position dependent intra prediction combination mode to the reference samples to determine modified reference samples based on the aspect ratio of the block; and generating a predictive block for the block based on the modified reference samples.

According to another example, a device for coding video data includes a memory configured to store the video data and one or more processing units coupled to the memory, implemented in circuitry, and configured to determine a block of the video data is intra predicted using an angular intra prediction mode, wherein the angular intra prediction mode is one of a bottom-left intra prediction mode or a top-right intra prediction mode; locating one or more reference samples corresponding to the angular intra prediction mode determine an aspect ratio of the block; apply weights according to a position dependent intra prediction combination mode to the reference samples to determine modified reference samples based on the aspect ratio of the block; and generate a predictive block for the block based on the modified reference samples.

According to another example, a non-transitory computer-readable storage medium stores instructions that when executed by one or more processors cause the one or more processors to determine a block of video data is intra predicted using an angular intra prediction mode, wherein the angular intra prediction mode is one of a bottom-left intra prediction mode or a top-right intra prediction mode; locate one or more reference samples corresponding to the angular intra prediction mode; determine an aspect ratio of the block; apply weights according to a position dependent intra prediction combination mode to the reference samples to determine modified reference samples based on the aspect ratio of the block; and generate a predictive block for the block based on the modified reference samples.

According to another example, an apparatus for decoding video data includes means for determining a block of video data is intra predicted using an angular intra prediction mode, wherein the angular intra prediction mode is one of a bottom-left intra prediction mode or a top-right intra prediction mode; means for locating one or more reference samples corresponding to the angular intra prediction mode; means for determining an aspect ratio of the block; means for applying weights according to a position dependent intra prediction combination mode to the reference samples to determine modified reference samples based on the aspect ratio of the block; and means for generating a predictive block for the block based on the modified reference samples.

The details of one or more examples are set forth in the accompanying drawings and the description below. Other features, objects, and advantages will be apparent from the description, drawings, and claims.

BRIEF DESCRIPTION OF DRAWINGS

FIG. 11 is a table illustrating the relationship between intra prediction mode and intra prediction angle.

DETAILED DESCRIPTION

Figure 1:
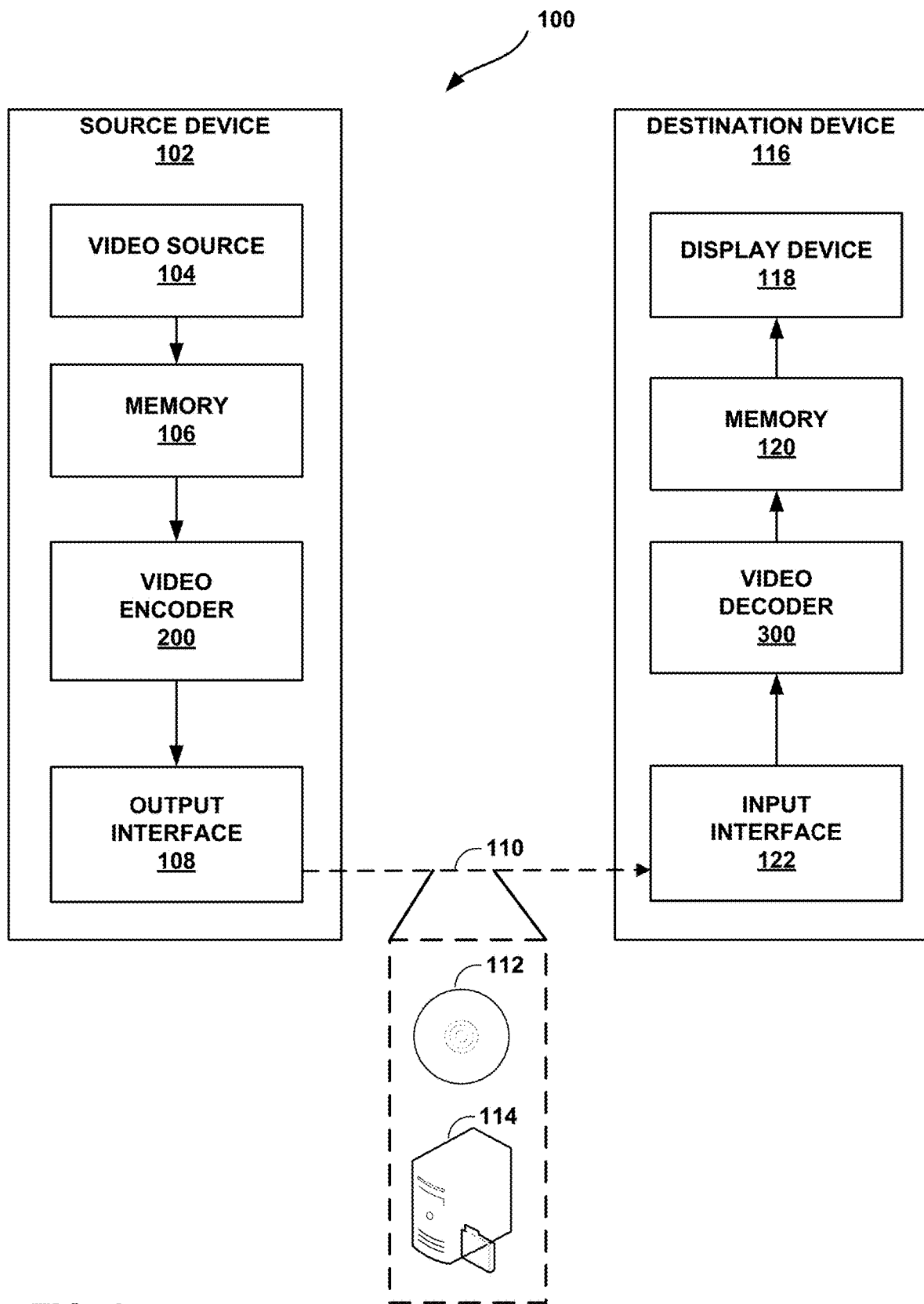
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the predictive block to the original block. Thus, the residual data represents a difference between the predictive block and the original block of video data. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the predictive block to produce a reconstructed video block that matches the original video block more closely than the predictive block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to intra prediction, which is a technique for predicting a block of video data using samples from neighboring blocks in the same picture as the block being predicted. One type of intra prediction is position dependent intra prediction combination (PDPC), which is described in more detail below. In PDPC, a video coder determines values for samples from a top reference line and a left reference line (referred to as PDPC reference samples) and uses a weighted average of the PDPC reference samples with the sample obtained from the intra prediction mode to achieve better compression efficiency. This disclosure describes techniques for controlling whether or not to perform PDPC for certain blocks of video data. The techniques of this disclosure may improve overall video coding quality and efficiency.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current sample, current CU, current block, current picture, current slice, etc. In the context of this disclosure, the term current is intended to identify a sample, CU, block, picture, slice, etc. that is currently being coded, as opposed to, for example, previously or already coded samples CUs, blocks, pictures, and slices or yet to be coded samples, CUs, blocks, pictures, and slices.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions, such as the currently developing Versatile Video Coding (VVC) standard.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing PDPC with non-square block diagonals. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform the techniques for performing PDPC with non-square block diagonals that are described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 110. Similarly, destination device 116 may access encoded data from storage device 110 via input interface 122. Storage device 110 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Other video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions. Video encoder 200 and video decoder 300 may additionally or alternatively operate according to other proprietary or industry standards, such as the Joint Exploration Test Model (JEM). The techniques of this disclosure, however, are not limited to any particular coding standard.

During the April 2018 meeting of the Joint Video Experts Team (JVET), the Versatile Video Coding (VVC) standardization activity (also known as ITU-T H.266) was kicked off with the evaluation of the video compression technologies submitted to the Call for Proposals. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)." Another early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)."

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs).

According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
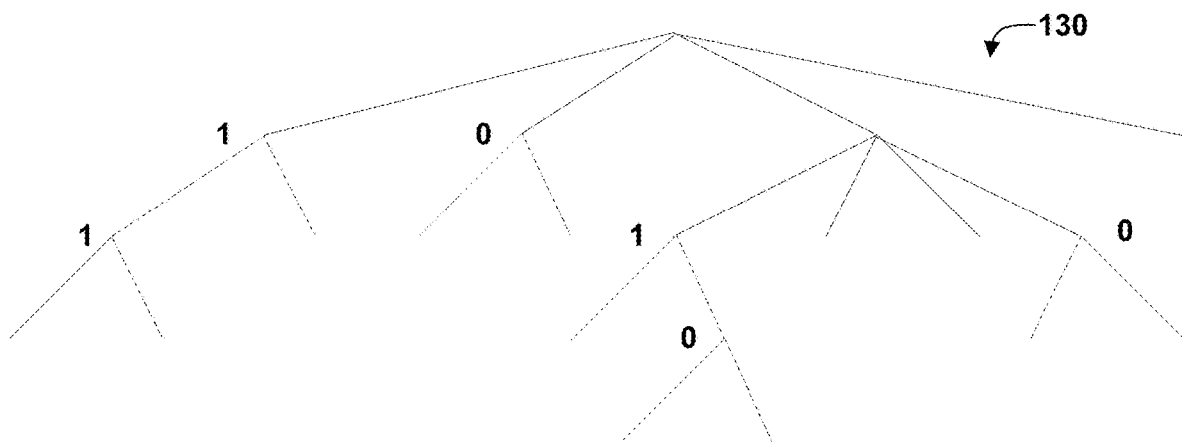
FIGS. 2A and 2B are conceptual diagrams illustrating an example quadtree binary tree (QTBT) structure, and a corresponding coding tree unit (CTU).
Figure 2B:
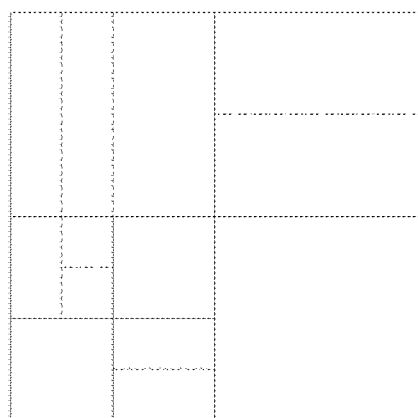

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example.

For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Video encoder 200 and video decoder 300 may be configured to code blocks of video data using a PDPC coding mode as described in this disclosure. Block-based intra prediction is part of video standards such as AVC, HEVC, VVC, etc. Typically, lines of reference samples from adjacent reconstructed blocks are used for predicting samples within a current block. One or multiple lines of samples may be used for predicting the current block. The reference samples are employed by typical intra prediction modes such as DC, planar, and angular/directional modes.

PDPC was proposed in ITU-T SG16/Q6 Doc. COM16-C1046, "Position Dependent intra Prediction Combination (PDPC)" and further simplified in X. Zhao, V. Seregin, A. Said, M. Karczewicz, "EE1 related: Simplification and extension of PDPC", 8th JVET Meeting, Macau, October 2018, JVET-H0057. M. Karczewicz et al., "Description of SDR, HDR and 360° video coding technology proposal by Qualcomm," 10th JVET Meeting, San Diego, Calif., USA, April 2018, JVET-J0021, describes techniques for applying PDPC to planar, DC, horizontal, and vertical modes without signaling. G. Van der Auwera, V. Seregin, A. Said, M. Karczewicz, "Extension of Simplified PDPC to Diagonal Intra Modes," 10th JVET Meeting, San Diego, Calif., USA, April 2018, JVET-J0069, describes further extending PDPC to diagonal directional modes and modes adjacent to diagonal directional modes.

Video encoder 200 and video decoder 300 may determine a prediction sample pred(x,y) located at (x,y) with an intra prediction mode (e.g., DC, planar, angular) and modify a value for pred(x,y) using the PDPC expression for a single reference sample line:

$$\text{pred}(x,y) = (wL \times R_{-1,y} + wT \times R_{x,-1} + (64 - wL - wT + wTL) \times \text{pred}(x,y) + 32) >> 6 \quad \text{(Eq. 1)}$$

where $R_{x,-1}$ and $R_{-1,y}$ represent the reference samples located at the top and left of the current sample (x,y), respectively, and $R_{-1,-1}$ represents the reference sample located at the top-left corner of the current block. For the DC mode, video encoder 200 and video decoder 300 may calculate weights as follows for a block with dimensions width and height:

$$wT = 32 >> ((y << 1) >> \text{shift}), wL = 32 >> ((x << 1) >> \text{shift}), wTL = (wL >> 4) + (wT >> 4),$$

with shift=(log$_2$(width)+log$_2$(height)+2)>>2,
while for planar mode wTL=0, for horizontal mode wTL=wT and for vertical mode wTL=wL. The PDPC weights can be calculated with adds and shifts only. The value of pred(x,y) can be computed in a single step using Eq. 1.

Figure 3B:
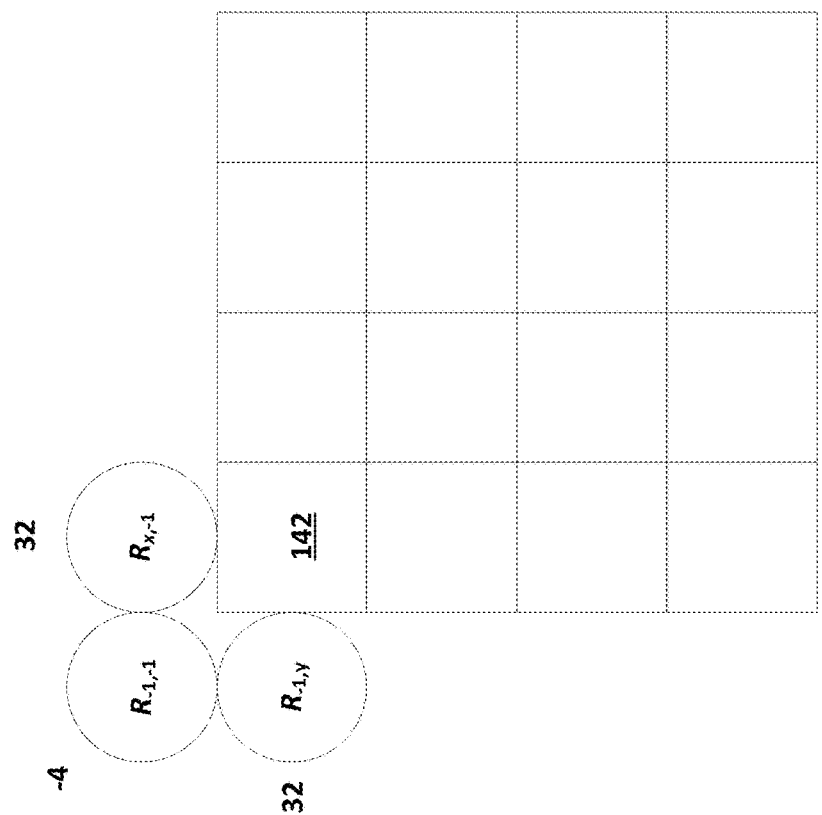
FIGS. 3A and 3B show examples of DC mode Position Dependent Intra Prediction Combination (PDPC) weights for sample positions (0,0) and (1,0) inside a 4×4 block.
Figure 3A:
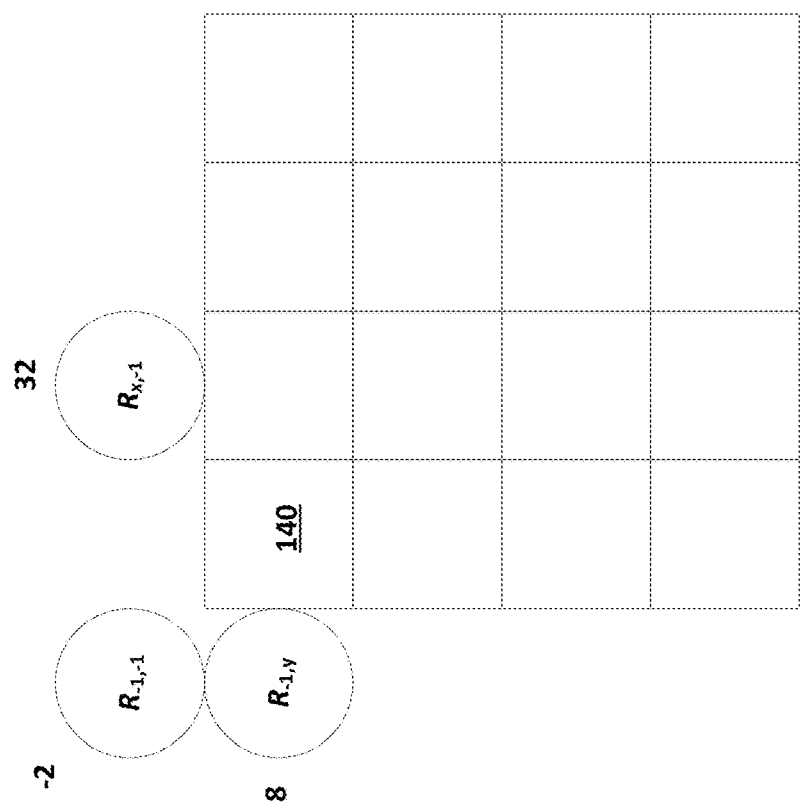

FIGS. 3A and 3B illustrate DC mode PDPC weights (wL, wT, wTL) for (0, 0) and (1, 0) positions inside one 4×4 block.

FIG. 3A illustrates DC mode PDPC weights (wL, wT, wTL) for the (1, 0) position (labeled as position 140 in FIG. 3A) inside a 4×4 block. FIG. 3B illustrates DC mode PDPC weights (wL, wT, wTL) for the (0, 0) position (labeled as position 142 in FIG. 3B) inside a 4×4 block. In the example of FIG. 3A, 8, −2, and 32 are represent potential weight values, and in the example of FIG. 3B, 32, −4 and 32 represent potential weight values. If PDPC is applied to DC, planar, horizontal, and vertical intra modes, then video encoder 200 and video decoder 300 may, in some instances, not apply additional boundary filters, such as the DC mode boundary filter or horizontal/vertical mode edge filters.

Equation (1) above may be generalized to include additional reference sample lines (e.g., not limited to samples one row above or one row left of the current block). In this case, multiple reference samples are available in the neighborhoods of Rx,−1, R−1,y, R−1,−1 and each may have a weight assigned that can be optimized, for example, by training.

U.S. Provisional Patent Application 62/651,424 filed 2 Apr. 2018 and US Patent Publication 2019/0306513 A1, both of which are incorporated herein by reference, describe techniques to extend PDPC to the diagonal intra modes and to the angular modes that are adjacent to the diagonal modes. The intended diagonal intra modes are the modes that predict according to the bottom-left and top-right directions, as well as several adjacent angular modes, such as the N adjacent modes between the bottom-left diagonal mode and vertical mode, and the N or M adjacent modes between the top-right diagonal mode and horizontal mode. In this context, a bottom-left diagonal mode describes an intra prediction mode that has a prediction direction that runs from a top-right corner of a block to a bottom-left corner of the block, and a top-right diagonal mode describes an intra prediction mode that has a prediction direction that runs from a bottom-left corner of a block to a top-right corner of the block. Blocks with different aspect ratios, or different shapes, may have different top-right diagonal modes and different bottom-left diagonal modes. That is, the top-right diagonal mode for a block of a first shape may have a different mode index and different prediction angle than the top-right diagonal mode for block of a second shape. Similarly, the bottom-left diagonal mode for a block of a first shape may have a different mode index and different prediction angle than the bottom-left diagonal mode for block of a second shape.

Figure 4:
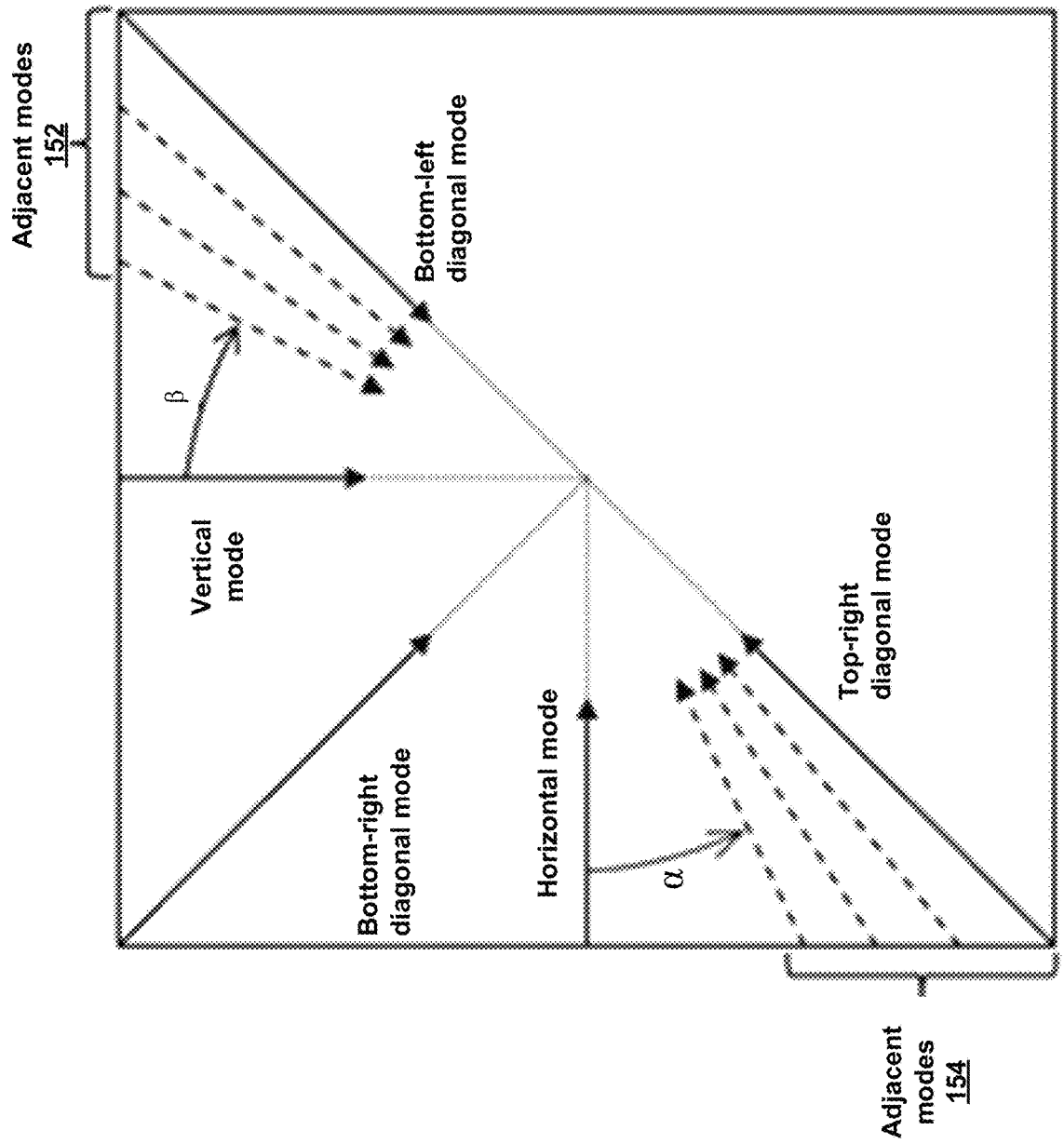
FIG. 4 shows examples of intra prediction angular modes.
Figure 5B:
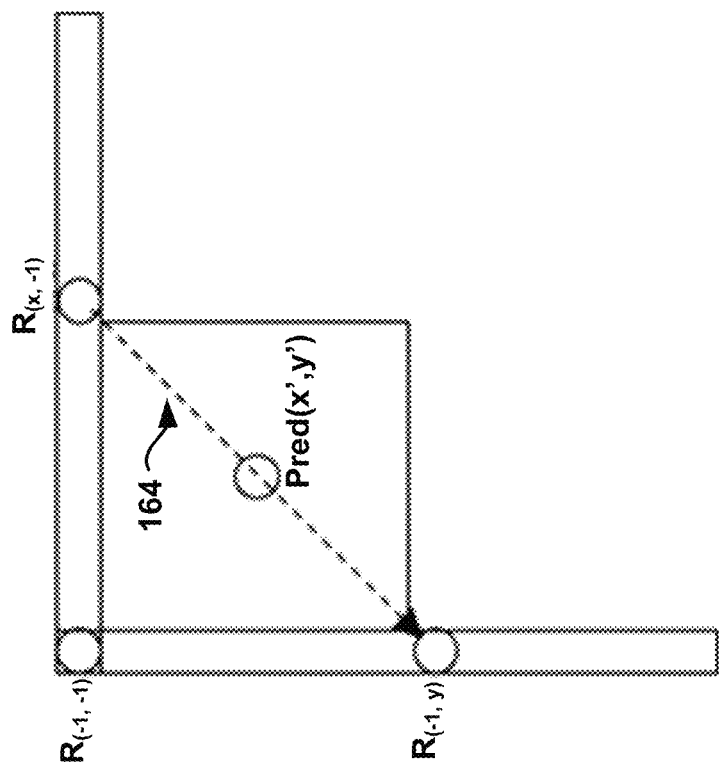
FIGS. 5A-5D show examples of samples used by PDPC extension to diagonal and adjacent angular intra modes.
Figure 5A:
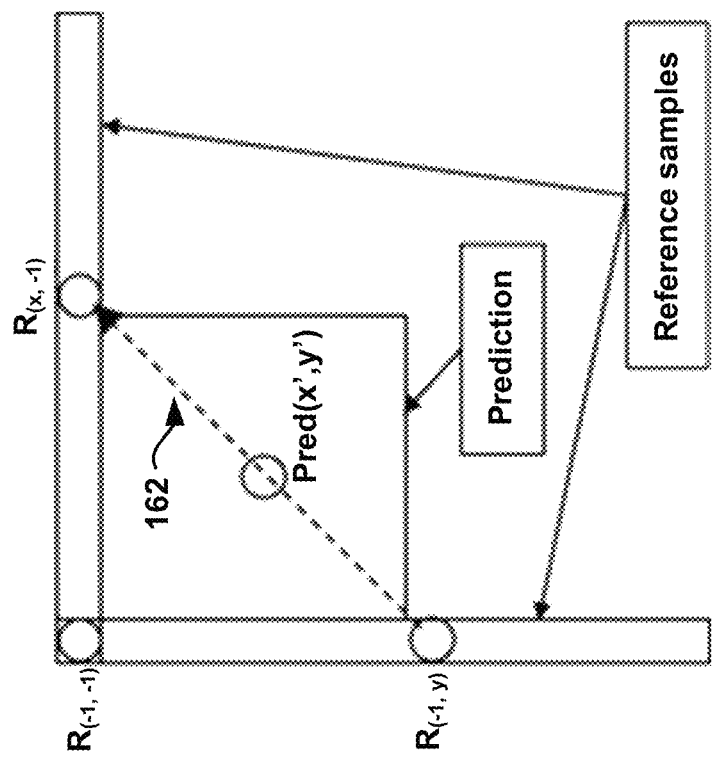
Figure 5D:
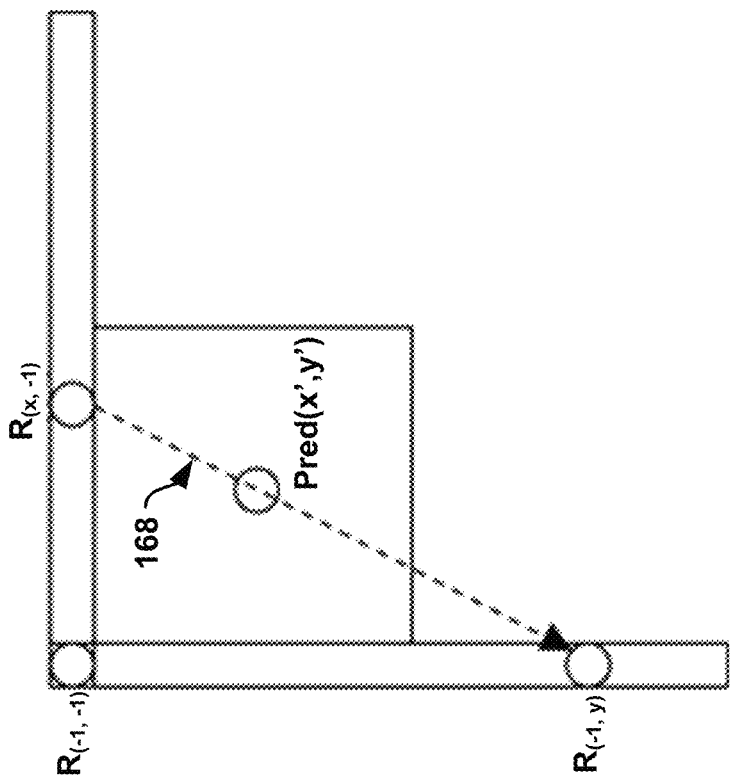
Figure 5C:
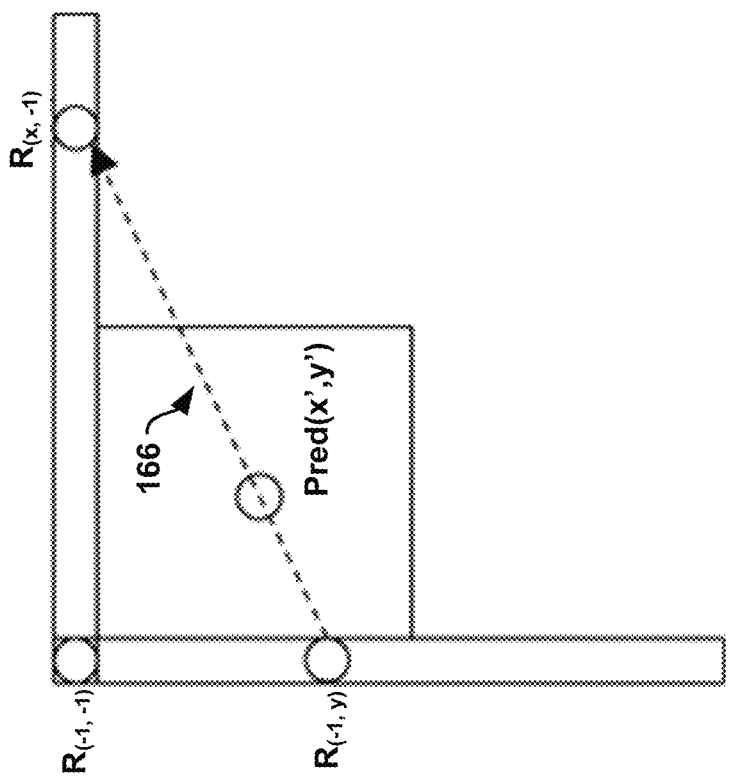

FIG. 4 shows examples of intra prediction angular modes. FIG. 4 illustrates the identification of the angular modes. In general, the adjacent modes may be a selected subset of available angular modes. The spacing between angular modes may be nonuniform and some angular modes may be skipped. In the example of FIG. 4, adjacent modes 152 represent the N adjacent modes between the bottom-left diagonal mode and vertical mode, and adjacent modes 154 represent the N or M adjacent modes between the top-right diagonal mode and horizontal mode FIGS. 5A-5D show examples of references samples that may be used when extending PDPC to diagonal and adjacent angular intra modes. FIG. 5A shows an example of a diagonal top-right mode. FIG. 5B shows an example of a diagonal bottom-left mode. FIG. 5C shows an example of an adjacent diagonal top-right mode. FIG. 5D shows an example of an adjacent diagonal bottom-left mode.

FIG. 5A shows reference samples $R_{x,-1}$, $R_{-1,y}$, and $R_{-1,-1}$ for the extension of PDPC to the top-right diagonal mode. The top-right diagonal mode is represented in FIG. 5A by arrow 162. The prediction sample pred(x', y') is located at (x', y') within the prediction block. The coordinate x of the reference sample is given by: x=x'+y'+1, and the coordinate y of the reference sample $R_{-1,y}$ is similarly given by: y=x'+y'+1.

The PDPC weights for the top-right diagonal mode are, for example:

$$wT=16>>((y'<<1)>>\text{shift}), wL=16>>((x'<<1)>>\text{shift}), wTL=0.$$

FIG. 5B shows reference samples $R_{x,-1}$ and $R_{-1,-1}$ for the extension of PDPC to the bottom-left diagonal mode. The bottom-left diagonal mode is represented in FIG. 5B by arrow 164. The coordinate x of the reference sample $R_{x,-1}$ is given by: x=x'+y'+1, and the coordinate y of the reference sample $R_{-1,y}$ is: y=x'+y'+1.

The PDPC weights for the bottom-left diagonal mode are, for example:

$$wT=16>>((y'<<1)>>\text{shift}), wL=16>>((x'<<1)>>\text{shift}), wTL=0.$$

FIG. 5C shows reference samples $R_{x,-1}$, $R_{-1,y}$, and $R_{-1,-1}$ for the extension of PDPC to an adjacent top-right diagonal mode. The adjacent top-right diagonal mode is represented in FIG. 5C by arrow 166. In general, for the angle α illustrated in FIG. 4, they coordinate of the reference sample $R_{-1,y}$ is determined as follows:

$$y=y'+\tan(\alpha)\times(x'+1),$$

and the x coordinate of is given by:

$$x=x'+\text{co}\tan(\alpha)\times(y'+1),$$

with tan(α) and co tan(α) the tangent and cotangent of the angle α, respectively. The PDPC weights for an adjacent top-right diagonal mode are, for example:

$$wT=32>>((y'<<1)>>\text{shift}), wL=32>>((x'<<1)>>\text{shift}), wTL=0, \text{ or}$$

$$wT=32>>((y'<<1)>>\text{shift}), wL=0, wTL=0.$$

FIG. 5D shows reference samples $R_{x,-1}$, $R_{-1,y}$, and $R_{-1,-1}$ for the extension of PDPC to an adjacent bottom-left diagonal mode. The adjacent bottom-left diagonal mode is represented in FIG. 5D by arrow 168. In general, for the angle β illustrated in FIG. 4, the x coordinate of the reference sample $R_{x,-1}$ is determined as follows:

$$x=x'+\tan(\beta)\times(y'+1),$$

and they coordinate of $R_{-1,y}$ is given by:

$$y=y'+\text{co}\tan(\beta)\times(x'+1),$$

with tan(β) and co tan(β) the tangent and cotangent of the angle β, respectively. The PDPC weights for an adjacent bottom-left diagonal mode are, for example:

$$wL=32>>((x'<<1)>>\text{shift}), wT=32>>((y'<<1)>>\text{shift}), wTL=0, \text{ or}$$

$$wL=32>>((x'<<1)>>\text{shift}), wT=0, wTL=0.$$

As is the case for DC, planar, horizontal and vertical mode PDPC, video encoder 200 and video decoder 300 may be configured to not apply any additional boundary filtering for diagonal and adjacent diagonal modes when PDPC is extended to these modes, as specified in J. Chen, E. Alshina, G. J. Sullivan, J. R. Ohm, J. Boyce, "Algorithm description of Joint Exploration Test Model 7," 7th JVET Meeting, Torino, Italy, July 2017, JVET-G1001.

Figure 6:
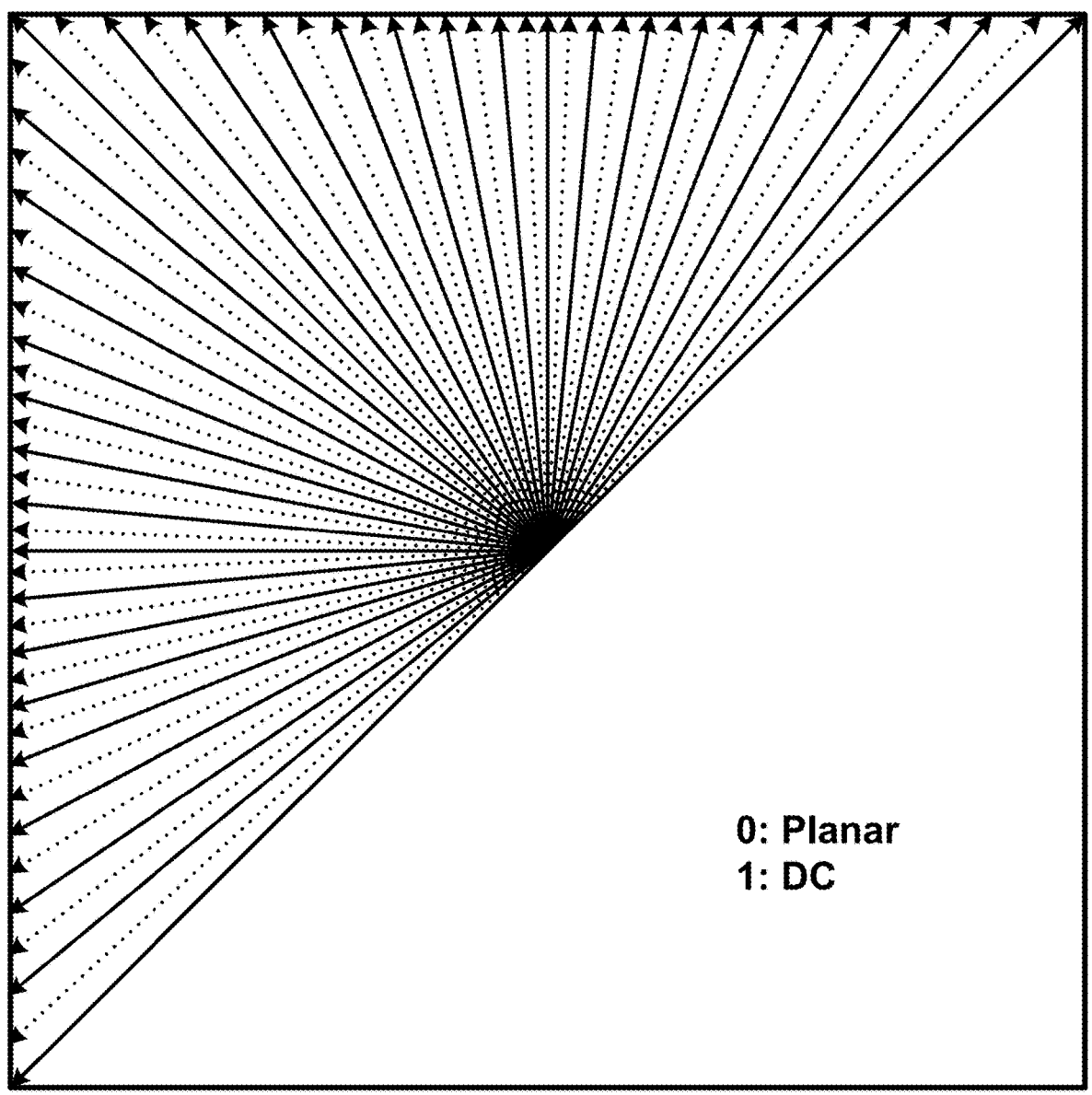
FIG. 6 shows example intra-prediction directions.

In some examples, video encoder 200 and video decoder 300 may be configured to perform wide-angle intra prediction. Intra prediction may for example include any of a DC prediction mode, a planar prediction mode, and directional (or angular) prediction modes. Directional prediction for square blocks uses directions between −135 degrees to 45 degrees of the current block in J. Chen, Y. Ye, S. Kim, "Algorithm description for Versatile Video Coding and Test Model 2 (VTM2)," 11th JVET Meeting, Ljubljana, SI, July 2018, JVET-K1002, as illustrated in FIG. 6. FIG. 6 shows directions of intra prediction, with the arrows pointing towards the reference samples.

In VTM2, the block structure used for specifying the prediction block for intra prediction is not restricted to be square (width w=height h). Rectangular, or non-square, prediction blocks (w>h or w<h) may increase the coding efficiency based on the characteristics of the content.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency, as it is potentially more beneficial to have the range of restrictions relaxed so that closer reference samples (beyond the −135 to 45-degree angle) can be used for prediction. An example of such a case is given in FIG. 7.

Figure 7:
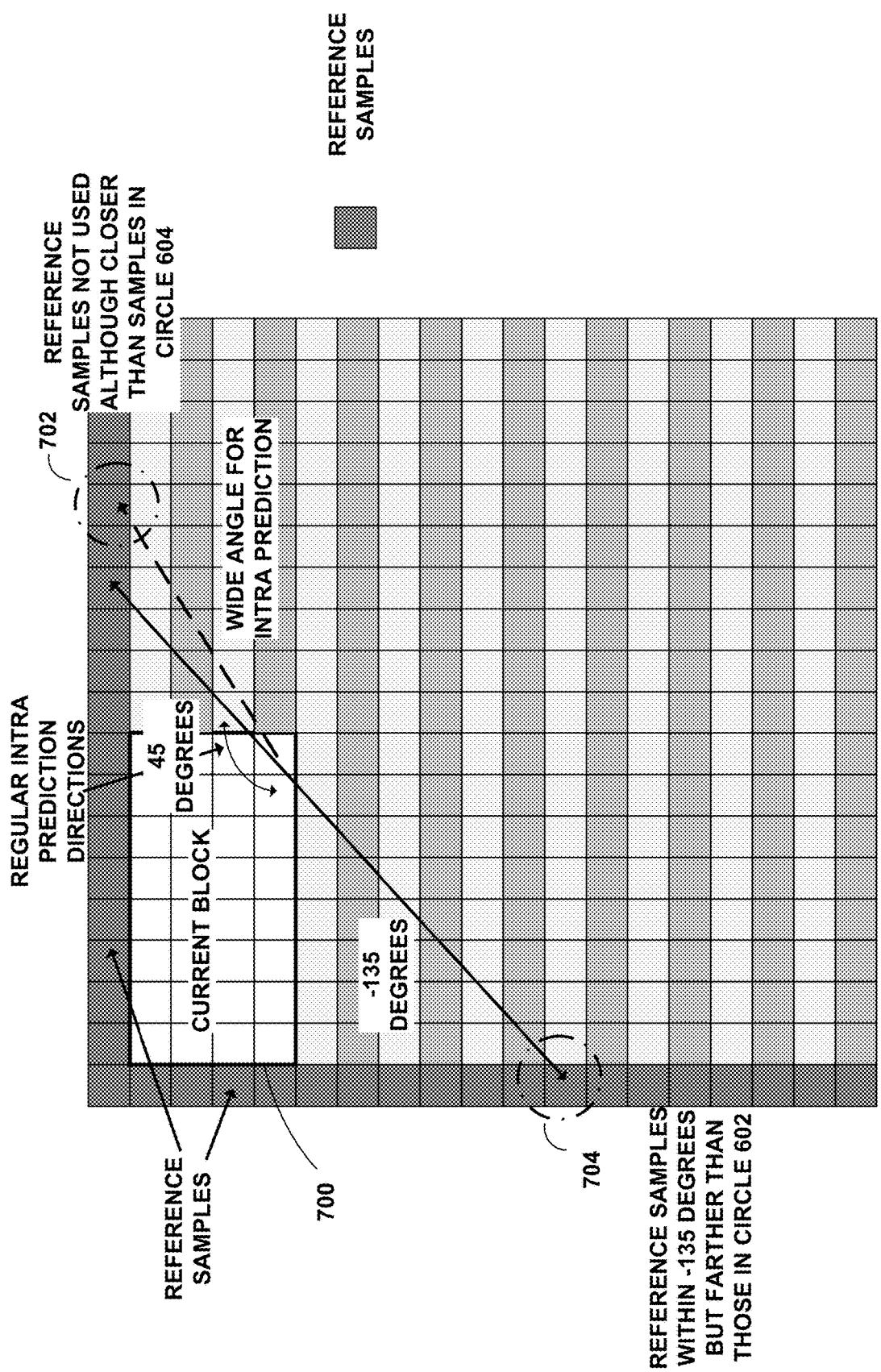
FIG. 7 is an illustration showing example reference samples that may be used for an 8×4 rectangular block.

FIG. 7 shows an example of a 4×8 rectangular current block 700 where "closer" reference samples (circle 702) are not used, but farther reference samples (circle 704) may be used, due to a restriction of the intra prediction directions to be in the range of −135 degrees to 45 degrees.

During the 12th JVET meeting, a modification of wide-angle intra prediction was proposed in L. Zhao, X. Zhao, S. Liu, X. Li, "CE3-related: Unification of angular intra prediction for square and non-square blocks," 12$^{th}$ JVET Meeting, Macau SAR, CN, October 2018, JVET-L0279 and was adopted into VTM3. VTM3 is described in J. Chen, Y. Ye, S. Kim, "Algorithm description for Versatile Video Coding and Test Model 3 (VTM3)," 12$^{th}$ JVET Meeting, Macau SAR, CN, October 2018, JVET-L1002.

Figure 8A:
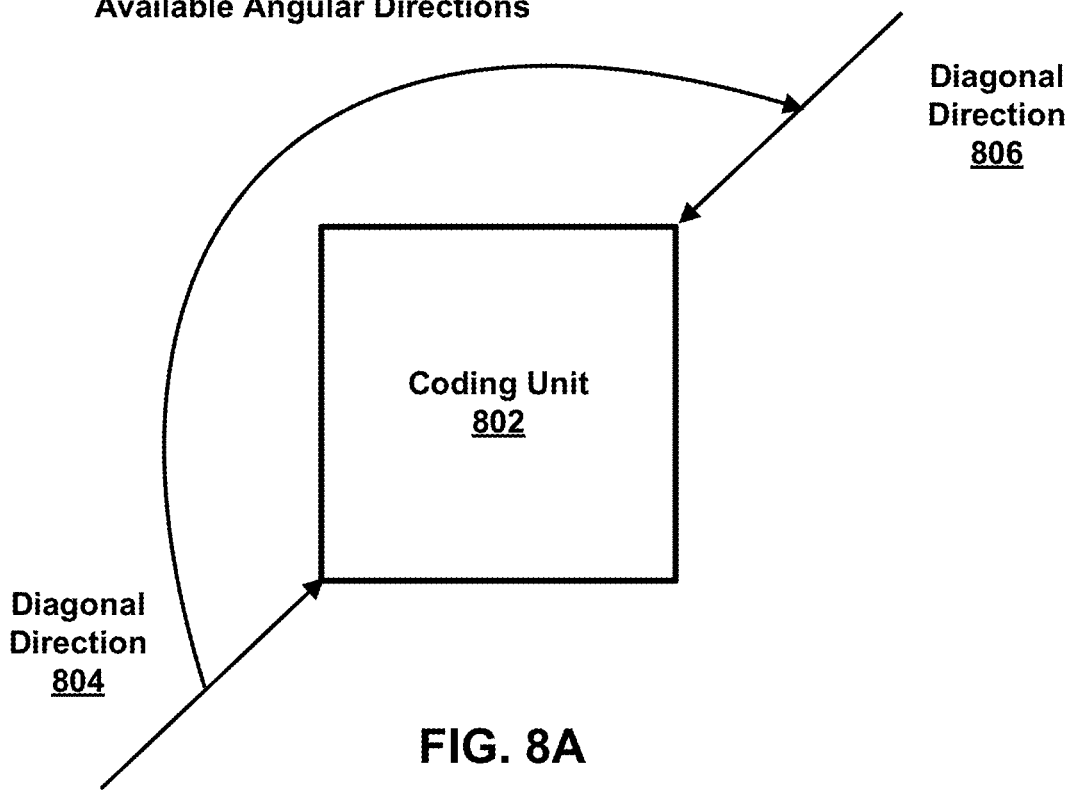
FIGS. 8A-8C show illustrations of mode mapping processes for modes outside the diagonal direction range.
Figure 8B:
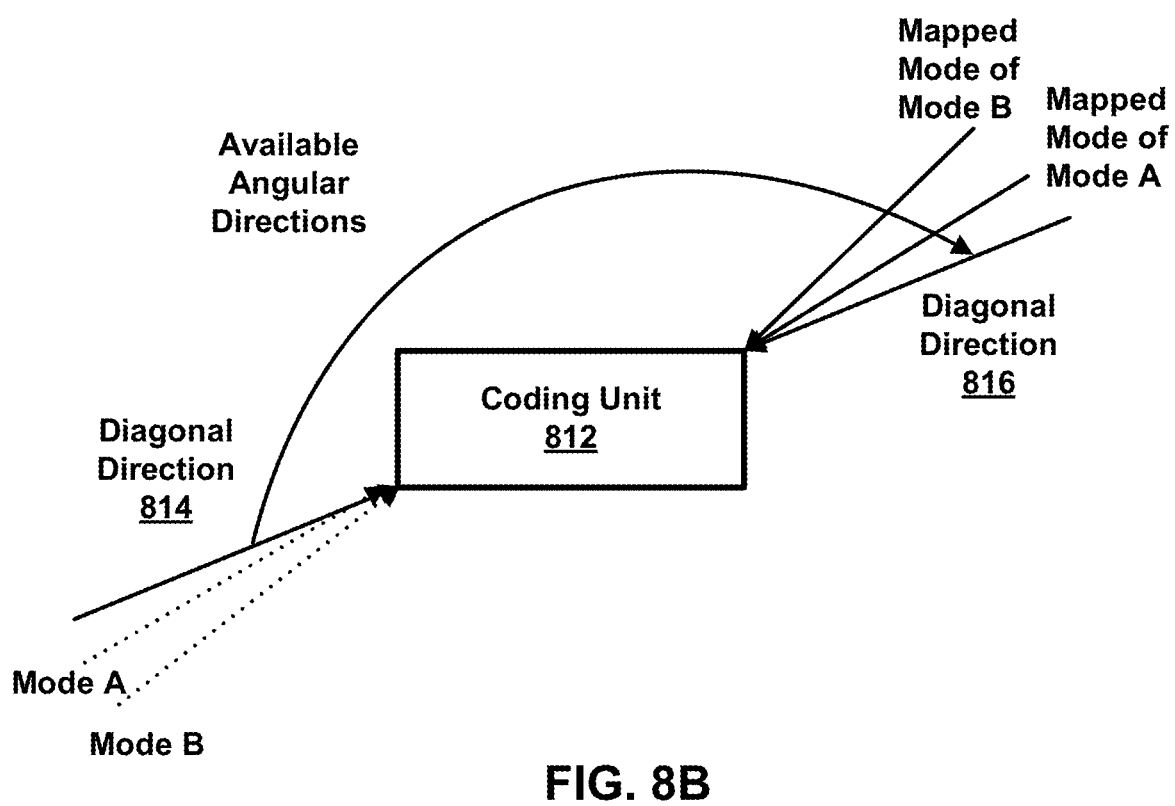
Figure 8C:
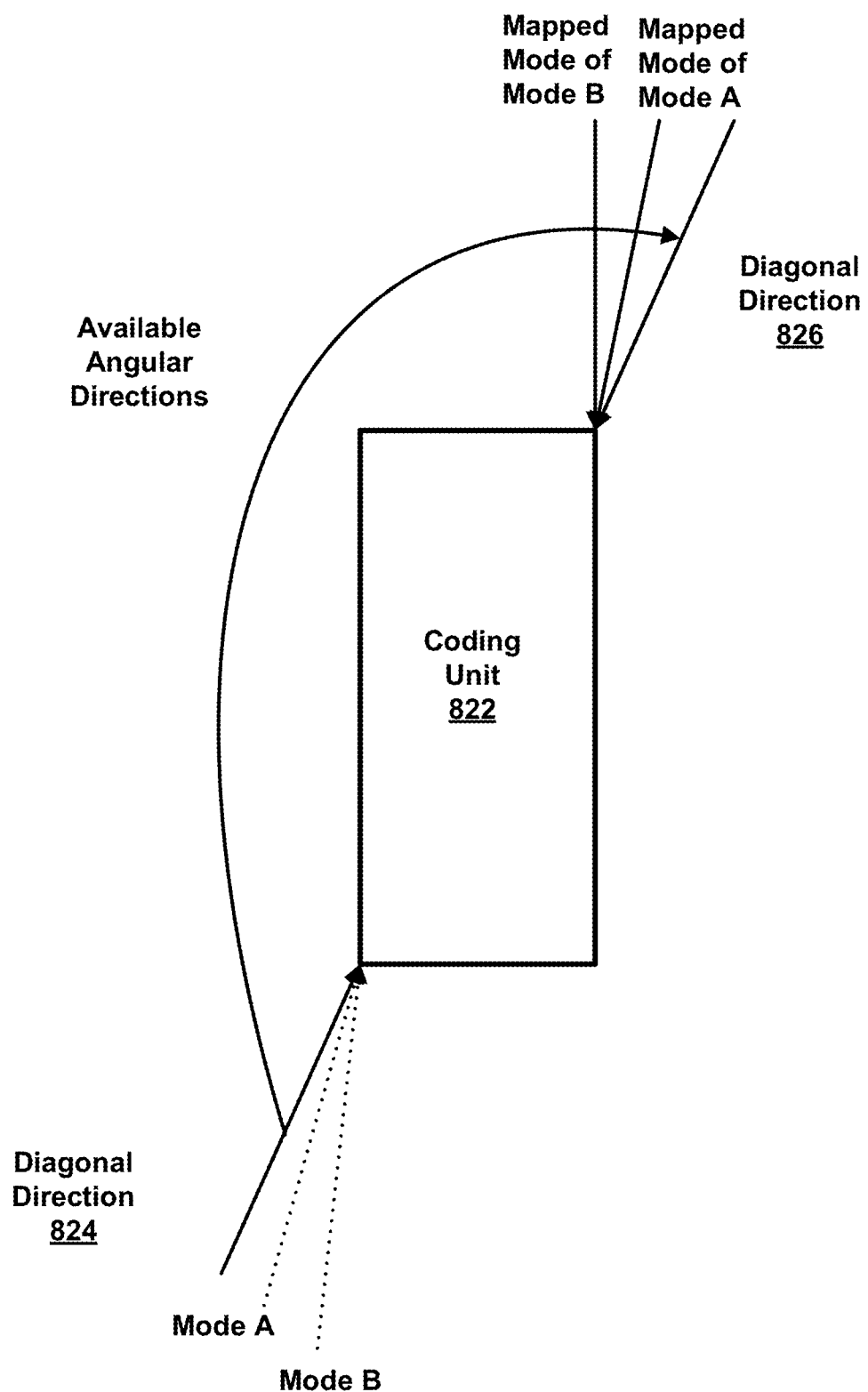

This proposal included two modifications to unify the angular intra prediction for square and non-square blocks. First, angular prediction directions were modified to cover diagonal directions of all block shapes. Secondly, all angular directions were kept within the range between the bottom-left diagonal direction and the top-right diagonal direction for all block aspect ratios (square and non-square) as illustrated in FIGS. 8A-8C. In addition, the number of reference samples in the top reference row and left reference column can be restricted to 2*width+1 and 2*height+1 for all block shapes.

FIGS. 8A-8C are conceptual diagram illustrating mode mapping for coding units with different shapes. Video encoder 200 and video decoder 300 may implement a mode mapping process to determine the available intra-prediction modes for various shapes and sized of CUs. FIG. 8A shows a square block that does not require angular mode remapping. FIG. 8B shows an angular mode remapping for a horizontal non-square block. FIG. 8C shows an angular mode remapping for a vertical non-square block. In FIGS. 8B and 8C, modes A and B are replaced by mapped modes A and B, such that there are still only 65 available angular modes, but those 65 available modes are different between FIG. 8A, FIG. 8B, and FIG. 8C.

In the example of FIG. 8A, CU 802 is a square block (i.e., w=h). Diagonal direction 804 corresponds to a 45-degree prediction angle, and diagonal direction 806 corresponds to a −135 degree prediction angle. All available prediction modes for CU 802 are between diagonal direction 804 and diagonal direction 806, and thus, no mode remapping is needed.

In the example of FIG. 8B, CU 812 is a non-square, rectangular block, where w is greater than h. Diagonal direction 814 represents the diagonal direction running from the bottom-left corner of CU 812 to the top-right corner of CU 812, and diagonal direction 616 represents the diagonal direction running from the top-right corner of CU 812 to the bottom-left corner of CU 812. As modes A and B are not between diagonal directions 814 and 816, modes A and B are replaced by mapped modes A and B, such that all available prediction modes for CU 812 are between diagonal direction 814 and diagonal direction 816.

In the example of FIG. 8C, CU 822 is a non-square, rectangular block, where h is greater than w. Diagonal direction 824 represents the diagonal direction running from the bottom-left corner of CU 822 to the top-right corner of CU 822, and diagonal direction 826 represents the diagonal direction running from the top-right corner of CU 822 to the bottom-left corner of CU 822. As modes A and B are not between diagonal directions 824 and 826, modes A and B are replaced by mapped modes A and B, such that all available prediction modes for CU 822 are between diagonal direction 824 and diagonal direction 826.

Figure 9:
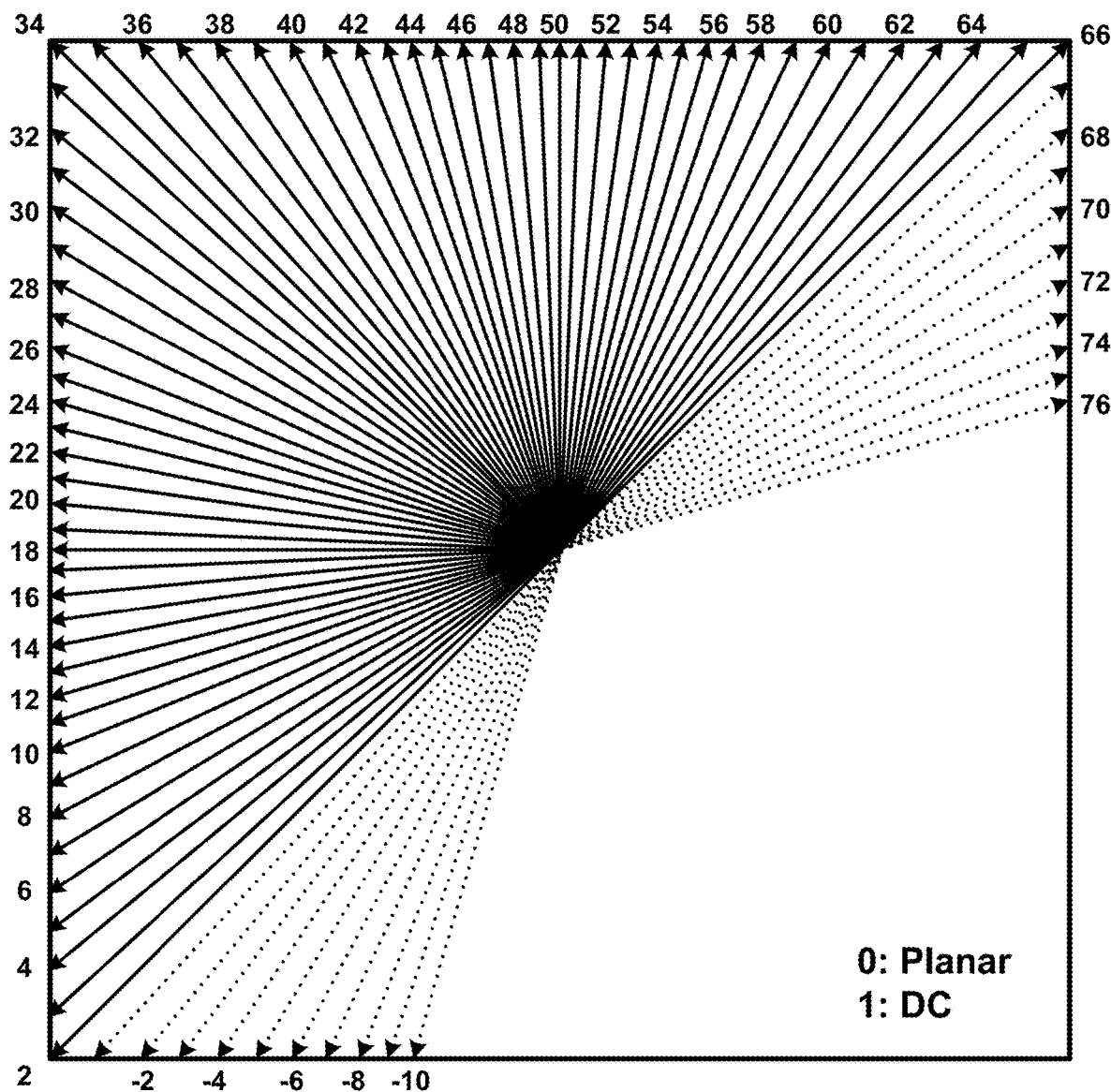
FIG. 9 is an illustration of wide angles that are adopted in VTM2 (full citation provided below).

FIG. 9 is an illustration of wide angles that are adopted in VTM2. FIG. 9 shows wide-angle modes (labeled −1 to −10 and 67 to 76 in FIG. 7) depicted in addition to the 65 angular modes. In the example of FIG. 9, mode 50 corresponds to a prediction angle of −90 degrees. Mode 66 corresponds to a prediction angle of −135 degrees, and mode 2 corresponds to a prediction angle of 45 degrees.

Figure 10:
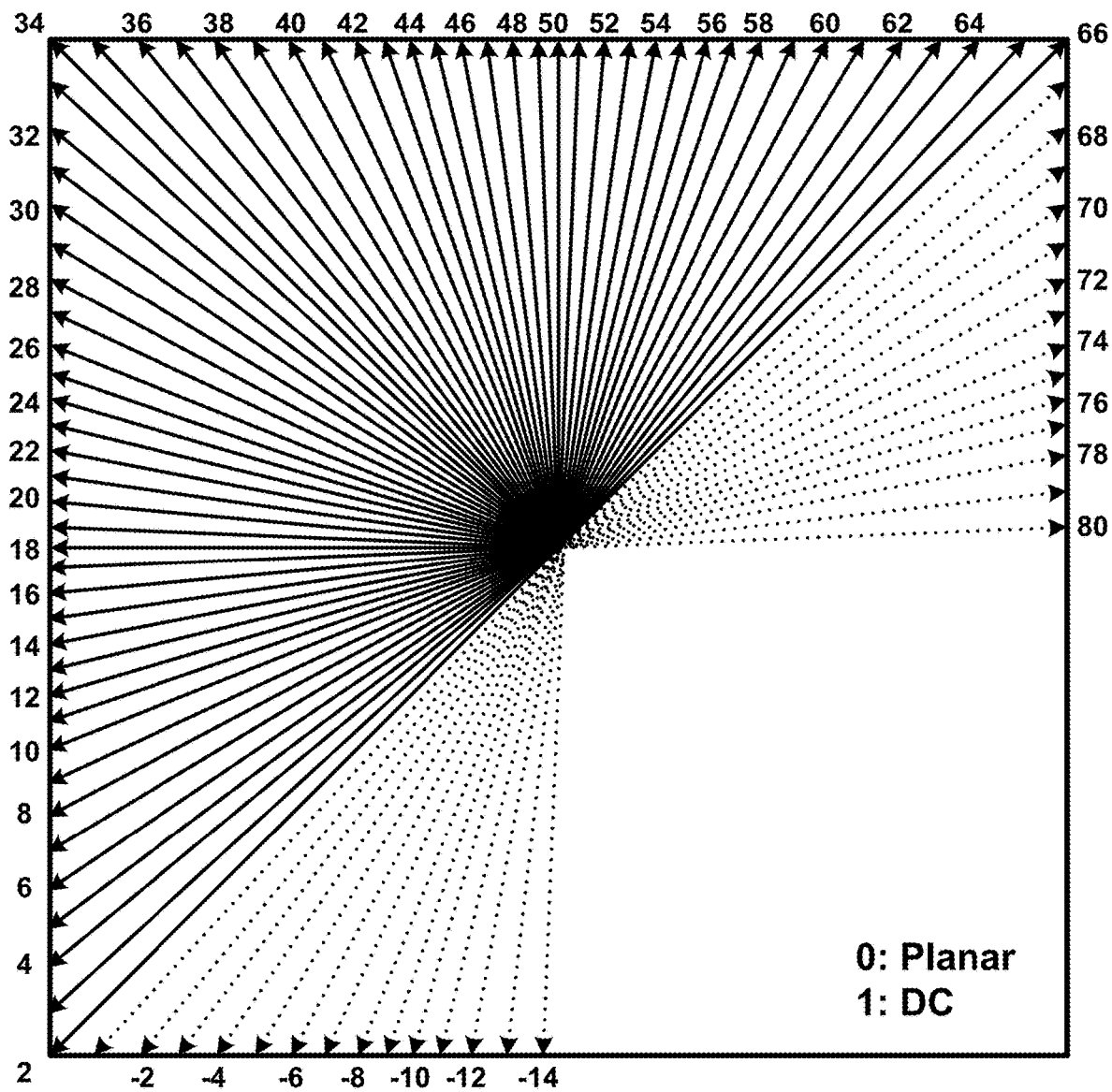
FIG. 10 shows an example of wide-angle modes in VTM3 (full citation provided below).

FIG. 10 shows an example of wide angles (labeled −1 to −14 and 67 to 80 in FIG. 10) in VTM3 beyond modes 2 and 66 for a total of 93 angular modes. In the example of FIG. 10, mode 50 corresponds to a prediction angle of −90 degrees. Mode 66 corresponds to a prediction angle of −135 degrees, and mode 2 corresponds to a prediction angle of 45 degrees. Although VTM3 defines 95 modes, for any block size only 67 modes are allowed. The exact modes that are allowed depend on the block width and height ratio. This is achieved by restricting the mode range based on block size.

FIG. 11 is a table showing the relationship between intra prediction mode and intra prediction angle. In particular, Table I in FIG. 11 specifies the mapping table between the intra prediction mode predModeIntra and the angle parameter intraPredAngle in VTM3. VTM3 is described in B. Bross, J. Chen, S. Liu, "Versatile Video Coding (Draft 3)," 12$^{th}$ JVET Meeting, Macau SAR, CN, October 2018, JVET-L100.

In Table 1, the angular modes corresponding with non-square block diagonals are shown with a caret symbol (^). The vertical and horizontal modes are shown with a pound sign (#) for reference. Square block diagonal modes are shown in Table 1 with an asterisk (*). In the following, angular modes with a positive intraPredAngle value are referred to as positive angular modes (mode index <18 or >50), while angular modes with a negative intraPredAngle value are referred to as negative angular modes (mode index >18 and <50).

Video encoder 200 and video decoder 300 may derive an inverse angle parameter invAngle based on intraPredAngle as follows:

$$invAngle = \text{Round}\left(\frac{256*32}{intraPredAngle}\right) \quad (1\text{-}1)$$

Note that, in the VTM3 specification, intraPredAngle values that are multiples of 32 (e.g., 0, 32, 64, 128, 256, 512) always correspond to prediction from non-fractional reference array samples.

Table 2 below shows the diagonal modes for blocks with various block aspect ratios.

TABLE 2

| Block aspect ratio (width/height) | Diagonal modes |
|---|---|
| 1 (square) | 2, 34, 66 |
| 2 | 8, 28, 72 |
| 4 | 12, 24, 76 |

TABLE 2-continued

| Block aspect ratio (width/height) | Diagonal modes |
|---|---|
| 8 | 14, 22, 78 |
| 16 | 16, 20, 80 |
| 1/2 | −6, 40, 60 |
| 1/4 | −10, 44, 56 |
| 1/8 | −12, 46, 54 |
| 1/16 | −14, 48, 52 |

Video encoder 200 and video decoder 300 may be configured to perform intra reference smoothing, which may also be referred to as mode-dependent intra smoothing (MDIS), and reference sample interpolation. In HEVC, before intra prediction, video encoder 200 and video decoder 300 may perform MDIS for the neighboring reference samples by potentially filtered the reference samples using a 2-tap linear or 3-tap (1,2,1)/4 filter. In MDIS, given the intra prediction mode index predModeIntra and block size nTbS, video encoder 200 and video decoder 300 may be configured to determine whether the reference smoothing process is performed, and if so, which smoothing filter is used. The following text is the related description from the HEVC specification:

"8.4.4.2.3 Filtering Process of Neighboring Samples
Inputs to this process are:
  the neighboring samples p[x][y], with x=−1, y=−1..nTbS*2−1 and x=0..nTbS*2−1, y=−1,
  a variable nTbS specifying the transform block size.
Outputs of this process are the filtered samples pF[x][y], with x=−1, y=−1..nTbS*2−1 and x=0..nTbS*2−1, y=−1.
The variable filterFlag is derived as follows:
  If one or more of the following conditions are true, filterFlag is set equal to 0:
    predModeIntra is equal to INTRA_DC.
    nTbS is equal 4.
  Otherwise, the following applies:
    The variable minDistVerHor is set equal to Min(Abs(predModeIntra−26), Abs(predModeIntra−10)).
    The variable intraHorVerDistThres[nTbS] is specified in Table 8-3.
    The variable filterFlag is derived as follows:
      If minDistVerHor is greater than intraHorVerDistThres[nTbS], filterFlag is set equal to 1.
      Otherwise, filterFlag is set equal to 0.

TABLE 8-3

Specification of intraHorVerDistThres [ nTbS ] for various transform block sizes

| | nTbS = 8 | nTbS = 16 | nTbS =32 |
|---|---|---|---|
| intraHorVerDistThres [ n TbS ] | 7 | 1 | 0 |

When filterFlag is equal to 1, the following applies:
The variable biIntFlag is derived as follows:
  If all of the following conditions are true, biIntFlag is set equal to 1:
    strong_intra_smoothing_enabled_flag is equal to 1
    nTbS is equal to 32
    Abs(p[−1][−1]+p[nTbS*2−1][−1]−2*p[nTbS−1][−1])<(1<<(BitDepth$_Y$−5))
    Abs(p[−1][−1]+p[−1][nTbS*2−1]−2*p[−1][nTbS−1])<(1<<(BitDepth$_Y$−5))

Otherwise, biIntFlag is set equal to 0.
The filtering is performed as follows:
  If biIntFlag is equal to 1, the filtered sample values pF[x][y] with
  x=−1, y=−1..63 and x=0..63, y=−1 are derived as follows:

$$pF[-1][-1]=p[-1][-1] \quad (8\text{-}30)$$

$$pF[-1][y]=((63-y)*p[-1][-1]+(y+1)*p[-1][63]+32)>>6 \text{ for } y=0..62 \quad (8\text{-}31)$$

$$pF[-1][63]=p[-1][63] \quad (8\text{-}32)$$

$$pF[x][-1]=((63-x)*p[-1][-1]+(x+1)*p[63][-1]+32)>>6 \text{ for } x=0..62 \quad (8\text{-}33)$$

$$pF[63][-1]=p[63][-1] \quad (8\text{-}34)$$

Otherwise (biIntFlag is equal to 0), the filtered sample values pF[x][y] with x=−1, y=−1..nTbS*2−1 and x=0..nTbS*2−1, y=−1 are derived as follows:

$$pF[-1][-1]=(p[-1][0]+2*p[-1][-1]+p[0][-1]+2)>>2 \quad (8\text{-}35)$$

$$pF[-1][y]=(p[-1][y+1]+2*p[-1][y]+p[-1][y-1]+2)>>2 \text{ for } y=0..nTbS*2-2 \quad (8\text{-}36)$$

$$pF[-1][nTbS*2-1]=p[-1][nTbS*2-1] \quad (8\text{-}37)$$

$$pF[x][-1]=(p[x-1][-1]+2*p[x][-1]+p[x+1][-1]+2)>>2 \text{ for } x=0..nTbS*2-2 \quad (8\text{-}38)$$

$$pF[nTbS*2-1][-1]=p[nTbS*2-1][-1] \quad (8\text{-}39)\text{"}$$

During the Joint Video Exploration Team (JVET) activities, the Joint Exploration Test Model (JEM) version 7, JVET-G1001 was defined and the following version of the MDIS table was included for luma blocks:

| sizeIndex | Threshold [sizeIndex] |
|---|---|
| 0 | 20 |
| 1 | 20 |
| 2 | 14 |
| 3 | 2 |
| 4 | 0 |
| 5 | 20 |
| 6 | 0 |

The block size index is defined as follows in JEM7:

sizeIndex=(log 2(BlockWidth)−2+log 2(BlockHeight)−2)/2+2−1

Whether to apply the [1 2 1]/4 smoothing filter to the intra reference samples is determined as follows:

IntraModeDiff=min(abs(IntraModeIdx−HOR_IDX), abs(IntraModeIdx−VER_IDX))

With HOR_IDX=18 and VER_IDX=50, because JEM7 has 65 directional intra modes (IntraModeIdx 2-66) in addition to planar (IntraModeIdx=0) and DC (IntraModeIdx=1) modes. The following condition determines whether to apply the smoothing filter:

IF IntraModeDiff>Threshold[sizeIndex] THEN "apply smoothing filter"

In VTM3 and VVC WD3, the following MDIS table is included:

| sizeIndex | Threshold [sizeIndex] |
|---|---|
| 0 | 20 |
| 1 | 20 |
| 2 | 20 |
| 3 | 14 |
| 4 | 2 |
| 5 | 0 |
| 6 | 0 |
| 7 | 0 |

The block size index is defined as follows in VTM3:

sizeIndex=(log 2(BlockWidth)+log 2(BlockHeight))/2

Video encoder 200 and video decoder 300 may be configured to determine whether to apply the [1 2 1]/4 smoothing filter to the non-fractional intra reference samples or switch the interpolation filters between smoothing (e.g., Gaussian interpolation) and non-smoothing (e.g., cubic interpolation) for fractional reference sample positions as follows (see also U.S. Provisional Patent Application 62/731,723, filed 14 Sep. 2018 and VVC WD3:

IntraModeDiff=min(abs(IntraModeIdx−HOR_IDX), abs(IntraModeIdx−VER_IDX))

with HOR_IDX=18 and VER_IDX=50 and the condition:
IF IntraModeDiff>Threshold[sizeIndex] THEN "apply smoothing"

In VTM3, for wide-angle modes with index<2 or >66, the intra smoothing condition is set equal to true. The reason being that two vertically-adjacent predicted samples may use two non-adjacent reference samples in the case of wide-angle intra prediction.

Existing techniques related to PDPC have some potential problems. In VTM3, angular directional modes corresponding with the diagonals of non-square blocks are adopted for intra prediction, while PDPC is currently applied to the top-right (mode 2) and bottom-left (mode 66) directions, which correspond with the diagonals of a square block only.

This disclosure introduces techniques that potentially address the problems introduced above. Specifically, this disclosure describes techniques for extending PDPC to the non-square block diagonals and adjacent modes.

Video encoder 200 and video decoder 300 may be configured to apply PDPC to positive angular modes corresponding to bottom-left and top-right diagonal prediction directions for prediction blocks with various values of block width divided by block height (aspect ratio). In one example, video encoder 200 and video decoder 300 may apply PDPC to diagonal prediction directions of square and non-square blocks.

Video encoder 200 and video decoder 300 may apply PDPC to diagonal prediction directions for square blocks (i.e., blocks with an aspect ratio equal to 1). In one example, video encoder 200 and video decoder 300 may apply PDPC to the top-right diagonal prediction direction, e.g., mode 2 as defined in Table 1. In another example, video encoder 200 and video decoder may additionally or alternatively apply PDPC to the bottom-left diagonal prediction direction, e.g., mode 66 as defined in Table 1.

Video encoder 200 and video decoder may also apply PDPC to diagonal prediction directions for non-square blocks (i.e., blocks with an aspect ratio smaller than 1 or greater than 1). In one example, video encoder 200 and video decoder 300 may apply PDPC to the top-right diagonal prediction direction, e.g., the modes enumerated in Table3 and defined in Table 1. In another example, video encoder 200 and video decoder 300 may apply PDPC to the bottom-left diagonal prediction direction, e.g., the modes enumerated in Table 3 and defined in Table 1.

TABLE 3

Top-right and bottom-left diagonal prediction modes corresponding with various aspect ratios.

| Block aspect ratio (width/height) | Top-right diagonal direction | Bottom-left diagonal direction |
|---|---|---|
| 1 (square) | 2 | 66 |
| 2 | 8 | 72 |
| 4 | 12 | 76 |
| 8 | 14 | 78 |
| 16 | 16 | 80 |
| 1/2 | −6 | 60 |
| 1/4 | −10 | 56 |
| 1/8 | −12 | 54 |
| 1/16 | −14 | 52 |

Figure 12A:
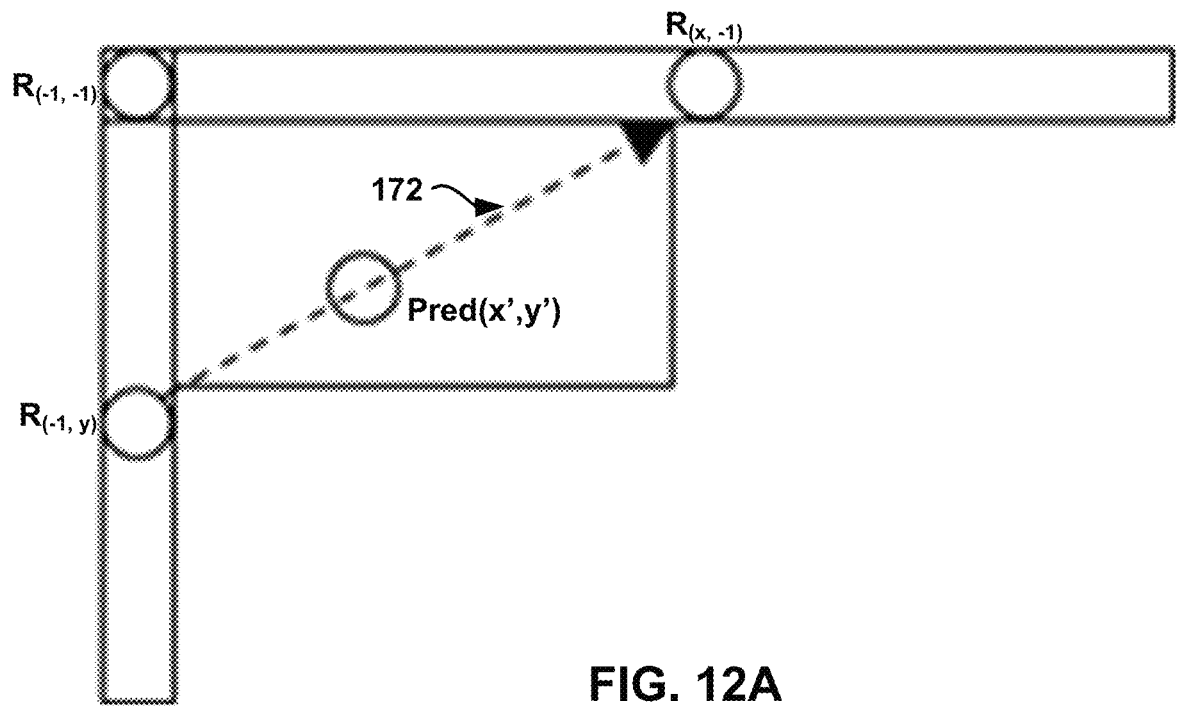
FIGS. 12A and 12B show examples of reference samples used for PDPC extension to diagonal angular intra modes of non-square blocks.
Figure 12B:
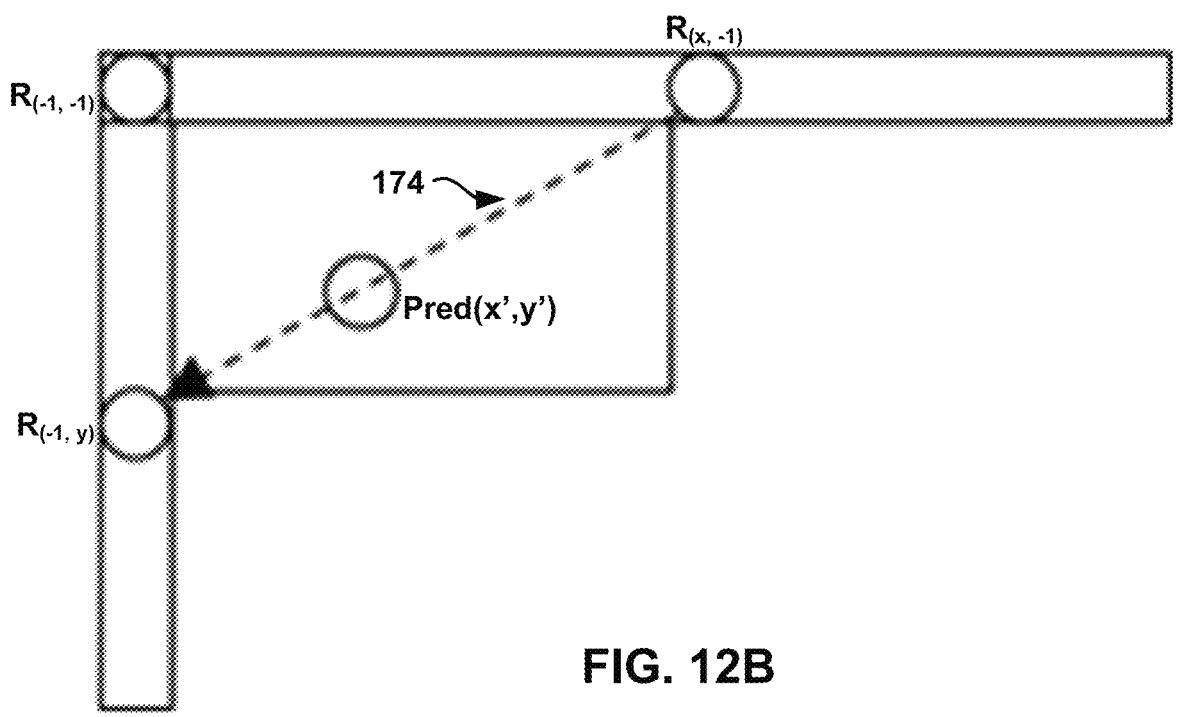

Video encoder 200 and video decoder 300 may be configured to implement PDPC for diagonal prediction directions by identifying left, top-left, and top sample locations in the reference sample arrays that consist of neighboring reconstructed samples. The prediction sample pred(x,y) located at (x,y) is predicted with a diagonal intra prediction mode and its value is modified using the PDPC expression for a single reference sample line as follows:

$$\text{pred}(x,y)=(wL \times R_{-1,y}+wT \times R_{x,-1}+(64-wL-wT+wTL) \times \text{pred}(x,y)+32)>>6 \quad (Eq.1)$$

where $R_{x,-1}$, $R_{-1,y}$ represent the reference samples located at the top and left of the current sample (x,y), respectively, and $R_{-1,-1}$ represents the reference sample located at the top-left corner of the current block. This is illustrated in FIGS. 12A and 12B. FIGS. 12A and 12B show examples of reference samples used for PDPC extension to diagonal angular intra modes of non-square blocks.

FIG. 12A shows top-right diagonal prediction, and FIG. 12B shows bottom-left diagonal prediction. The top-right diagonal mode is represented in FIG. 12A by arrow 172, and the bottom-left diagonal mode is represented in FIG. 12B by arrow 174.

In one example, video encoder 200 and video decoder 300 may calculate the weights wL, wT, wTL as follows for a block with dimensions width and height:

$wT=16>>((y<<1)>>\text{shift}), wL=16>>((x<<1)>>\text{shift}),$
$wTL=0$, with shift=(log$_2$(width)+log$_2$(height)+2)>>2

In some examples, video encoder 200 and video decoder 300 may filter the PDPC reference samples with a smoothing filter (MDIS), edge-preserving filter such as a bilateral filter, or other sample value altering process. Video encoder 200 and video decoder 300 may be configured to apply this process potentially dependent on conditions (position, block size, mode, etc.) or signaling in the bitstream.

In some examples, video encoder 200 and video decoder 300 may use the PDPC reference samples unprocessed or unfiltered. For example, for the top-right diagonal prediction direction, in one example, the PDPC prediction equation can be given by:

$$\text{pred}(x,y)=(wT \times R_{x,-1}+(64-wT) \times \text{pred}(x,y)+32)>>6$$
with $wT=16>>((y<<1)>>\text{shift})$ \quad (Eq. 2)

As another example, for the down-left diagonal prediction direction, in one example, the PDPC prediction equation can be given by:

$$\text{pred}(x,y)=(wL \times R_{-1,y}+(64-wL) \times \text{pred}(x,y)+32)>>6$$
with $wL=16>>((x<<1)>>\text{shift})$ \quad (Eq. 3)

In some examples, video encoder 200 and video decoder 300 may apply PDPC in cases where multiple lines of reference samples are available for intra prediction. The PDPC reference samples can be selected from any reference line used for intra prediction or from the reference samples nearest to the block boundary. In one example, video encoder 200 and video decoder 300 may select the PDPC reference samples from samples that are derived from one or more reference lines that may be used for intra prediction (e.g., average of two reference lines).

In some examples, video encoder 200 and video decoder 300 may enable or disable PDPC by signaling in the bitstream (parameter sets, tile or slice headers, coding unit headers, transform unit headers, etc.) or by checking conditions (sample position, block size, block mode, neighboring block modes, availability of reference samples and other data, etc.). In some examples, PDPC may be enabled or disabled for all intra modes. In some examples, PDPC may be enabled or disabled for a subset of intra modes, such as diagonal prediction directions (square or non-square), planar, DC, horizontal, vertical, etc. In some examples, PDPC may be enabled or disabled for individual intra modes. In some examples, in addition, various PDPC parameters such as weight values may also be signaled in the bitstream or determined by checking conditions.

In some examples, video encoder 200 and video decoder 300 can determine, for a top-right diagonal prediction direction, the angle α (shown in FIG. 4) and the y' coordinate of the reference sample $R_{-1,y}(-1, y')$ as follows:

$$y'=y+\tan(\alpha)\times(x+1),$$

and the x' coordinate of $R_{x,-1}(x', -1)$ is given by:

$$x'=x+\cot(\alpha)\times(y+1)$$

In some examples, video encoder 200 and video decoder 300 can determine, for a bottom-left diagonal prediction direction, the angle β (shown in FIG. 4) and the x' coordinate of the reference sample $R_{x,-1}(x', -1)$ as follows:

$$x'=x+\tan(\beta)\times(y+1),$$

and the y' coordinate of $R_{-1,y}(-1, y')$ is given by:

$$y'=y+\cot(\beta)\times(x+1)$$

In some examples, video encoder 200 and video decoder 300 can determine the values of the tangents and cotangents of angles by computing such value or looking up such values in a look up table. As an example, the intraPredAngle values in Table 1 correspond with 32*tan(α) values of the top-right diagonal prediction directions (modes enumerated in Table 3), while co tan(α) values can be computed with $$256 * \cotan(\alpha) = \text{Round}\left(\frac{256 * 32}{intraPredAngle}\right).$$

If intraPredAngle or 32*tan(α) values are multiples of 32, then y' is an integer value and, therefore, then video encoder 200 and video decoder 300 may copy the reference sample $R_{-1,y}(-1, y')$ from the reference sample array. Similarly, if 256*co tan(α) is a multiple of 256, then x' is an integer value, then video encoder 200 and video decoder 300 may copy the reference sample $R_{x,-i}(x', -1)$ from the reference sample array. Otherwise, if x' or y' are non-integer values, then video encoder 200 and video decoder 300 may interpolate (e.g., linear, cubic, gaussian, etc.) the reference sample from the reference sample array.

As another example, the intraPredAngle values in Table 1 correspond with 32*tan(β) values of the bottom-left diagonal prediction directions (modes enumerated in Table 3), while co tan(β) values can be computed with $$256 * \cotan(\beta) = \text{Round}\left(\frac{256 * 32}{intraPredAngle}\right).$$

If intraPredAngle or 32*tan(β) values are multiples of 32, then x' is an integer value and, therefore, video encoder 200 and video decoder 300 may copy the reference sample $R_{x,-1}(x', -1)$ from the reference sample array. Similarly, if 256*co tan(β) is a multiple of 256, then y' is an integer value and, video encoder 200 and video decoder 300 may copy the reference sample $R_{-1,y}(-1, y')$ from the reference sample array. Otherwise, if x' or y' are non-integer values, then video encoder 200 and video decoder 300 may interpolate (e.g., linear, cubic, gaussian, etc.) the reference sample from the reference sample array.

In some examples, video encoder 200 and video decoder 300 may apply PDPC to top-right diagonal prediction directions if 256*co tan(α) is a multiple of 256 or, equivalently, if co tan(α) is an integer value. In some examples, video encoder 200 and video decoder 300 may apply PDPC to bottom-left diagonal prediction directions if 256*co tan(β) is a multiple of 256 or, equivalently, if co tan(β) is an integer value. In some examples, video encoder 200 and video decoder 300 may apply PDPC to top-right diagonal prediction directions if 32*tan(α) is a multiple of 32 or, equivalently, if tan(α) is an integer value. In some examples, video encoder 200 and video decoder 300 may apply PDPC to bottom-left diagonal prediction directions if 32*tan(β) is a multiple of 32 or, equivalently, if tan(β) is an integer value.

Video encoder 200 and video decoder 300 may be configured to apply PDPC to a diagonal prediction direction (e.g., top-right or bottom-left), and apply PDPC to one or more mode values that are adjacent to the prediction direction; this may apply to blocks with any aspect ratio. For example, for a prediction block with width-to-height ratio equal to 2, video encoder 200 and video decoder 300 may apply PDPC to the top-right diagonal prediction direction (mode 8 in Table 3). In this case, video encoder 200 and video decoder 300 may also apply PDPC to modes 9, 10, 11, etc. The number of adjacent modes may be 8, 16, etc.

In some examples, a threshold value T may be defined as a function of block width and block height (i.e., T(w,h)) such that when d is a diagonal prediction direction, video encoder 200 and video decoder 300 may apply PDPC to modes in the range [d−T(w,h), d+T(w,h)]. In some examples, a threshold value T may be defined as a function of block width and block height (i.e., T(w,h)) such that when d is a diagonal prediction direction, video encoder 200 and video decoder 300 may apply PDPC to modes in the range [d−T(w,h), d]. In some examples, a threshold value T may be defined as a function of block width and block height (i.e., T(w,h)) such that when d is a diagonal prediction direction, video encoder 200 and video decoder 300 may apply PDPC to modes in the range [d, d+T(w,h)].

The value of T(w, h) may be signaled in the bitstream or may be pre-defined. In some examples, T(w, h) may be derived from one or more syntax elements signaled in the bitstream. The value of T(w,h) may be defined as a function of the width-to-height ratio, i.e., w/h.

In one example, the modes near the diagonal prediction direction may be a selected subset from the adjacent modes. For example, one mode may be skipped every other mode.

PDPC weights, such as wL, wT, wTL may have different values for the adjacent modes compared with the diagonal modes. For example, for adjacent modes:

$$wT=32>>((y<<1)>>\text{shift}), wL=32>>((x<<1)>>\text{shift}),$$
$$wTL=0,$$

and for diagonal modes:

$$wT=16>>((y<<1)>>\text{shift}), wL=16>>((x<<1)>>\text{shift}),$$
$$wTL=0,$$

Video encoder 200 and video decoder 300 may be configured to generate PDPC reference samples by filtering one or more reference samples. A filter may be chosen based on the block width and height, and the prediction direction. The chosen filter may be used to generate reference samples for PDPC. For example, when the aspect ratio is equal to 2, and the prediction direction corresponds top-right diagonal, a longer tap filter may be used for generating the PDPC reference samples.

In some examples, the PDPC reference samples may be generated unfiltered or unprocessed for some prediction directions, the PDPC reference samples may be generated filtered for other prediction directions. For example, for width-to-height ratio greater than 1, when the prediction direction mode corresponds to a bottom-left diagonal (or a mode near the bottom-left diagonal), PDPC reference samples may be generated unfiltered; when the prediction direction mode corresponds to a top-right diagonal (or a mode near the top-right diagonal), PDPC reference samples may be generated filtered.

Figure 13:
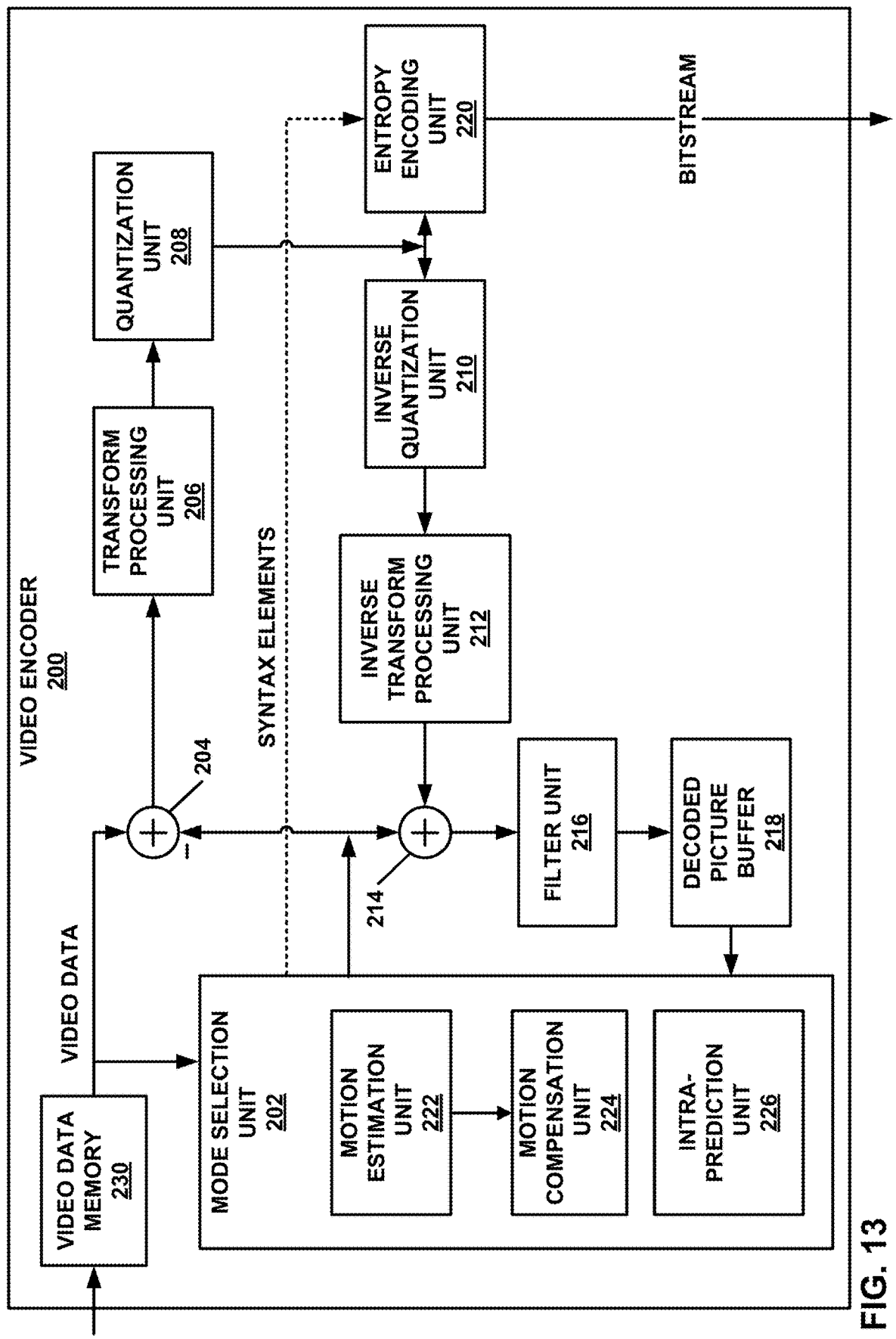
FIG. 13 is a block diagram illustrating an example video encoder that may perform the techniques of this disclosure.

FIG. 13 is a block diagram illustrating an example video encoder 200 that may perform the techniques of this disclosure. FIG. 13 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 13, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

As described in more detail above, intra-prediction unit 226 may be configured to determine a block of video data is intra predicted using an angular intra prediction mode that is one of a bottom-left intra prediction mode or a top-right intra prediction mode; determine an aspect ratio of the block; locate one or more reference samples corresponding to the angular intra prediction mode; apply position dependent intra prediction combination to the reference samples to determine modified reference samples based on the aspect ratio of the block; and generate a predictive block for the block based on the modified reference samples.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 14:
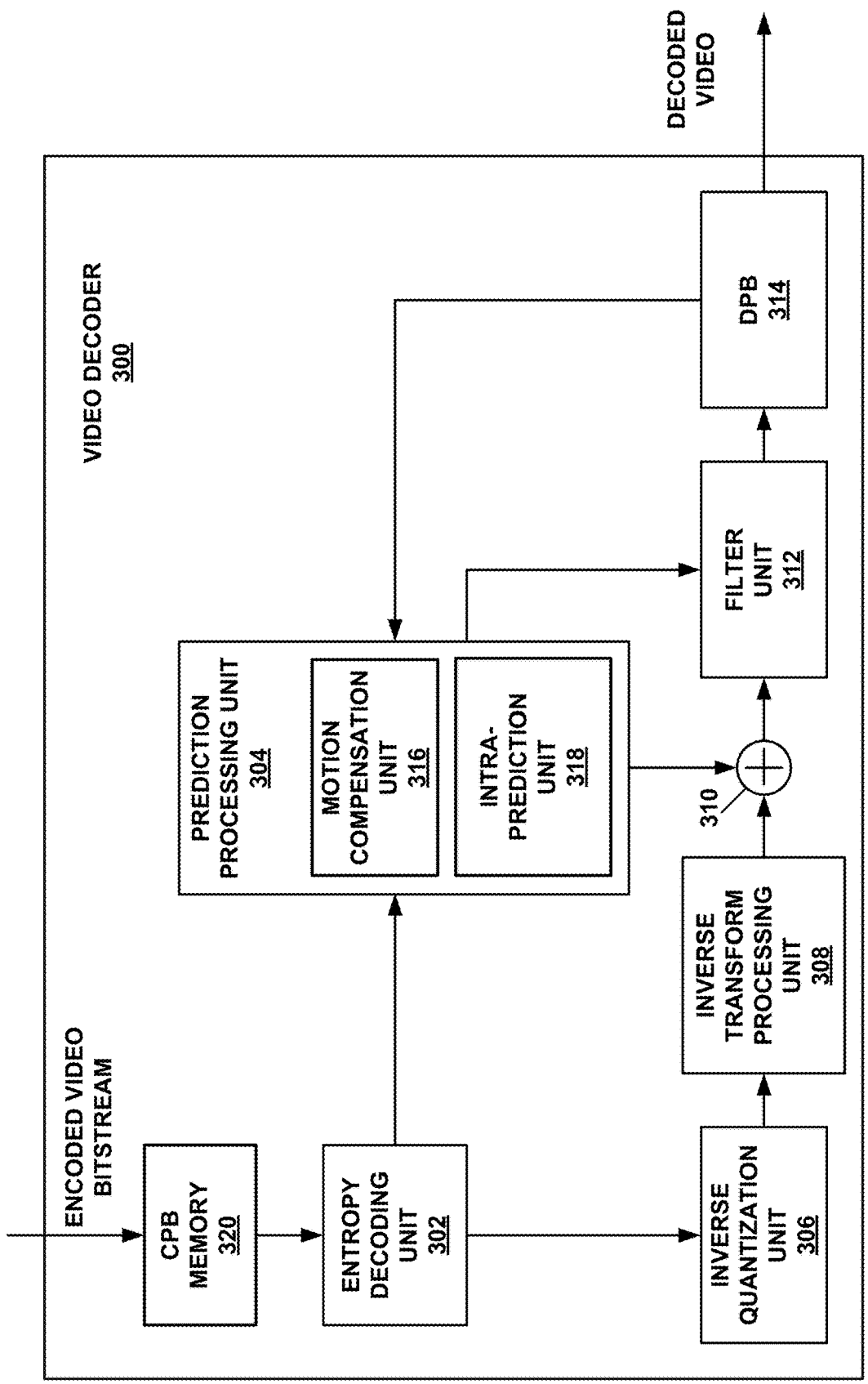
FIG. 14 is a block diagram illustrating an example video decoder that may perform the techniques of this disclosure.

FIG. 14 is a block diagram illustrating an example video decoder 300 that may perform the techniques of this disclosure. FIG. 14 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 14, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 14 are illustrated to assist with understanding the operations performed by video decoder 300. The units may be implemented as fixed-function circuits, programmable circuits, or a combination thereof. Similar to FIG. 13, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 13).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 13). Intra-prediction unit 318 may retrieve data of neighboring samples to the current block from DPB 314.

As described in more detail above, intra-prediction unit 318 may be configured to determine a block of video data is intra predicted using an angular intra prediction mode that is one of a bottom-left intra prediction mode or a top-right intra prediction mode; determine an aspect ratio of the block; locate one or more reference samples corresponding to the angular intra prediction mode; apply position dependent intra prediction combination to the reference samples to determine modified reference samples based on the aspect ratio of the block; and generate a predictive block for the block based on the modified reference samples.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Figure 15:
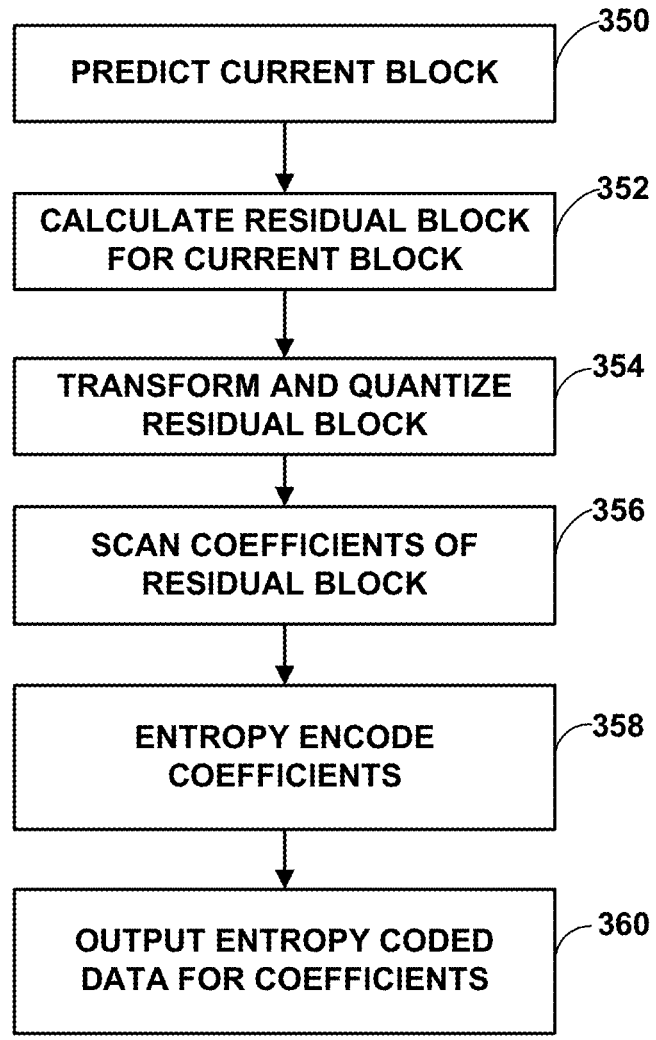
FIG. 15 is a flowchart illustrating a video encoding process in accordance with the techniques of this disclosure.

FIG. 15 is a flowchart illustrating an example process for encoding a current block. The current block may include a current CU. Although described with respect to video encoder 200 (FIGS. 1 and 13), it should be understood that other devices may be configured to perform a method similar to that of FIG. 15.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 16:
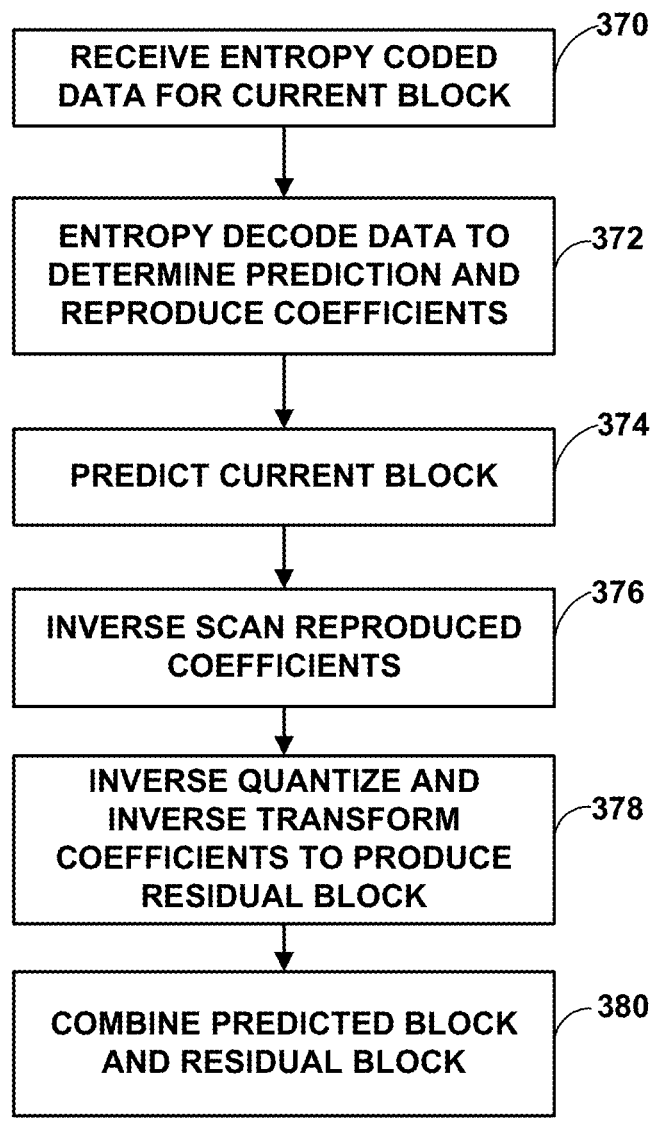
FIG. 16 is a flowchart illustrating a video decoding process in accordance with the techniques of this disclosure.

FIG. 16 is a flowchart illustrating an example process for decoding a current block of video data. The current block may include a current CU. Although described with respect to video decoder 300 (FIGS. 1 and 14), it should be understood that other devices may be configured to perform a method similar to that of FIG. 16.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 17:
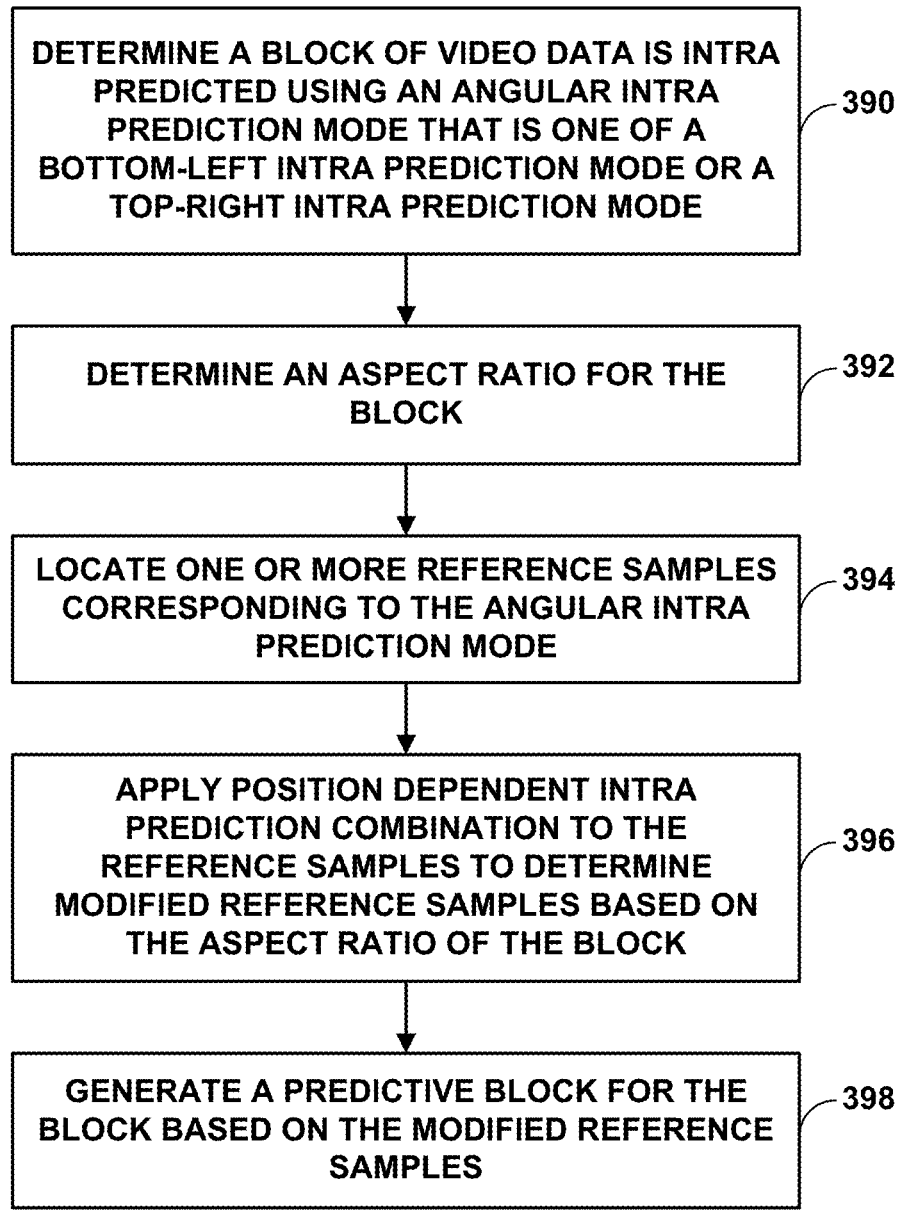
FIG. 17 is a flowchart illustrating a video decoding process in accordance with the techniques of this disclosure.

FIG. 17 is a flowchart illustrating an example process for decoding a current block of video data. The current block may include a current CU. Although described with respect to video decoder 300 (FIGS. 1 and 14), it should be understood that other devices may be configured to perform a method similar to that of FIG. 17. As one example, intra-prediction unit 226 of video encoder 200 may also be configured to perform the process of FIG. 17.

Video decoder 300 determines a block of video data is intra predicted using an angular intra prediction mode that is one of a bottom-left intra prediction mode or a top-right intra prediction mode (390). The block may, for example, be a non-square block of video data.

Video decoder 300 determines an aspect ratio of the block (392). Video decoder 300 locates one or more reference samples corresponding to the angular intra prediction mode (394). Video decoder 300 applies position dependent intra prediction combination to the reference samples to determine modified reference samples based on the aspect ratio of the block (396).

To apply position dependent intra prediction combination to the reference samples to determine modified reference samples based on the aspect ratio of the block, video decoder 300 may, for example, be configured to determine a top-right diagonal direction for the block based on the aspect ratio of the block, and in response to the angular intra prediction mode corresponding to the top-right diagonal direction for the block, apply position dependent intra prediction combination to the reference samples to determine the modified reference samples. To apply position dependent intra prediction combination to the reference samples to determine modified reference samples based on the aspect ratio of the block, video decoder 300 may, for example, be configured to determine a bottom-left diagonal direction for the block based on the aspect ratio of the block, and in response to the angular intra prediction mode corresponding to the bottom-left diagonal direction for the block, apply position dependent intra prediction combination to the reference samples to determine the modified reference samples.

To apply position dependent intra prediction combination to the reference samples to determine modified reference samples based on the aspect ratio of the block, video decoder 300 may, for example, determine a top-right diagonal direction for the block based on the aspect ratio of the block, and in response to a mode index for the angular intra prediction mode being within a threshold value of a mode index for an intra prediction mode corresponding to the top-right diagonal direction, apply position dependent intra prediction combination to the reference samples to determine the modified reference samples. To apply position dependent intra prediction combination to the reference samples to determine modified reference samples based on the aspect ratio of the block, video decoder 300 may, for example, determine a bottom-left diagonal direction for the block based on the aspect ratio of the block, and in response to a mode index for the angular intra prediction mode being within a threshold value of a mode index for an intra prediction mode corresponding to the bottom-left diagonal direction, applying position dependent intra prediction combination to the reference samples to determine the modified reference samples. The threshold values may, for example, vary based on a width, height, or aspect ratio of the block.

Video decoder 300 generates a predictive block for the block based on the modified reference samples (398). In instances, video decoder 300 may add a residual block to the predictive block as described in FIG. 16 to generate a reconstructed block. Video decoder 300 may also apply one or more filtering operations to the reconstructed block to generate a decoded block. Video decoder 300 may output the decoded block by, for example, storing a decoded picture that includes the decoded block for use in encoder or decoding future picture of video data, outputting the decoded picture for display, or storing the decoded picture for future display.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a first block of video data is intra predicted using a first angular intra prediction mode, wherein the first angular intra prediction mode is one of a bottom-left intra prediction mode or a top-right intra prediction mode, wherein the first block of video data comprises a first non-square block of video data;
   locating one or more first reference samples corresponding to the first angular intra prediction mode;
   determining that a first aspect ratio of the first block is not equal to one;
   determining values for first weights based on the first aspect ratio of the first block not being equal to one;
   applying the first weights according to a position dependent intra prediction combination mode to the first reference samples to determine first modified reference samples;
   generating a first predictive block for the first block based on the first modified reference samples;
   determining a second block of the video data is intra predicted using a second angular intra prediction mode, wherein the second block of video data comprises a second non-square block of video data;
   locating one or more second reference samples corresponding to the second angular intra prediction mode;
   determining that a second aspect ratio of the second block is not equal to one and is different than the first aspect ratio of the first block;
   determining second values for second weights based on the second aspect ratio of the second block not being equal to one;
   applying the second weights according to the position dependent intra prediction combination mode to the second reference samples to determine second modified reference samples based on the second aspect ratio of the second block, wherein the second weights are different than the first weights; and
   generating a second predictive block for the second block based on the second modified reference samples.

2. The method of claim 1, wherein applying the first weights according to the position dependent intra prediction combination mode to the first reference samples to determine the first modified reference samples comprises:
   based on the first aspect ratio of the first block, determining a top-right diagonal direction for the first block; and
   in response to the first angular intra prediction mode corresponding to the top-right diagonal direction for the first block, applying position dependent intra prediction combination to the first reference samples to determine the first modified reference samples.

3. The method of claim 1, wherein applying the first weights according to the position dependent intra prediction combination mode to the first reference samples to determine the first modified reference samples comprises:
   based on the first aspect ratio of the first block, determining a bottom-left diagonal direction for the first block; and
   in response to the first angular intra prediction mode corresponding to the bottom-left diagonal direction for the first block, applying position dependent intra prediction combination to the first reference samples to determine the first modified reference samples.

4. The method of claim 1, wherein applying the first weights according to the position dependent intra prediction combination mode to the first reference samples to determine the first modified reference samples comprises:
- based on the first aspect ratio of the first block, determining a top-right diagonal direction for the first block; and
- in response to a mode index for the first angular intra prediction mode being within a threshold value of a mode index for an intra prediction mode corresponding to the top-right diagonal direction, applying position dependent intra prediction combination to the first reference samples to determine the first modified reference samples.

5. The method of claim 1, wherein applying the first weights according to the position dependent intra prediction combination mode to the first reference samples to determine the first modified reference samples comprises:
- based on the first aspect ratio of the first block, determining a bottom-left diagonal direction for the first block; and
- in response to a mode index for the first angular intra prediction mode being within a threshold value of a mode index for an intra prediction mode corresponding to the bottom-left diagonal direction, applying position dependent intra prediction combination to the first reference samples to determine the first modified reference samples.

6. The method of claim 1, wherein the method of decoding is performed as part of a video encoding process.

7. The method of claim 1, further comprising:
- determining values for wL, wT, and wTL based on the first aspect ratio of the first block not being equal to one, wherein wL, wT, and wTL comprise the first weights, and
- wherein applying the first weights according to the position dependent intra prediction combination mode to the first reference samples to determine modified reference samples comprises applying the first weights according to the following equation:

$$\text{mod\_pred}(x,y) = (wL \times R_{-1,y} + wT \times R_{x,-1} - wTL \times R_{-1,-1} + (64 - wL - wT + wTL) \times \text{pred}(x,y) + 32) >> 6$$

wherein mod_pred(x,y) represents a modified prediction values for current sample (x,y), pred(x,y) represents a prediction value for the current sample (x,y), $R_{x,-1}$ and $R_{-1,y}$ represent reference samples located at a top and left of current sample (x,y), respectively, and $R_{-1,-1}$ represents a reference sample located at a top-left corner of the first block.

8. A device for coding video data, the device comprising:
a memory configured to store the video data; and
one or more processing units coupled to the memory, implemented in circuitry, and configured to:
- determine a first block of video data is intra predicted using a first angular intra prediction mode, wherein the first angular intra prediction mode is one of a bottom-left intra prediction mode or a top-right intra prediction mode, wherein the first block of video data comprises a first non-square block of video data;
- locate one or more first reference samples corresponding to the first angular intra prediction mode;
- determine that a first aspect ratio of the first block is not equal to one;
- determine values for first weights based on the first aspect ratio of the first block not being equal to one;
- apply the first weights according to a position dependent intra prediction combination mode to the first reference samples to determine first modified reference samples;
- generate a first predictive block for the first block based on the first modified reference samples;
- determine a second block of the video data is intra predicted using a second angular intra prediction mode, wherein the second block of video data comprises a second non-square block of video data;
- locate one or more second reference samples corresponding to the second angular intra prediction mode;
- determine that a second aspect ratio of the second block is not equal to one and is different than the first aspect ratio of the first block;
- determine second values for second weights based on the second aspect ratio of the second block not being equal to one;
- apply the second weights according to the position dependent intra prediction combination mode to the second reference samples to determine second modified reference samples based on the second aspect ratio of the second block, wherein the second weights are different than the first weights; and
- generate a second predictive block for the second block based on the second modified reference samples.

9. The device of claim 8, wherein to apply the first weights according to the position dependent intra prediction combination mode to the first reference samples to determine the first modified reference samples, the one or more processing units are configured to:
- based on the first aspect ratio of the first block, determine a top-right diagonal direction for the first block; and
- in response to the first angular intra prediction mode corresponding to the top-right diagonal direction for the first block, apply position dependent intra prediction combination to the first reference samples to determine the first modified reference samples.

10. The device of claim 8, wherein to apply the first weights according to the position dependent intra prediction combination mode to the first reference samples to determine the first modified reference samples, the one or more processing units are configured to:
- based on the first aspect ratio of the first block, determine a bottom-left diagonal direction for the first block; and
- in response to the first angular intra prediction mode corresponding to the bottom-left diagonal direction for the first block, apply position dependent intra prediction combination to the first reference samples to determine the first modified reference samples.

11. The device of claim 8, wherein to apply the first weights according to the position dependent intra prediction combination mode to the first reference samples to determine the first modified reference samples, the one or more processing units are configured to:
- based on the first aspect ratio of the first block, determine a top-right diagonal direction for the first block; and
- in response to a mode index for the first angular intra prediction mode being within a threshold value of a mode index for an intra prediction mode corresponding to the top-right diagonal direction, apply position dependent intra prediction combination to the first reference samples to determine the first modified reference samples.

12. The device of claim 8, wherein to apply the first weights according to the position dependent intra prediction combination mode to the first reference samples to determine the first modified reference samples, the one or more processing units are configured to:

based on the first aspect ratio of the first block, determine a bottom-left diagonal direction for the first block; and in response to a mode index for the first angular intra prediction mode being within a threshold value of a mode index for an intra prediction mode corresponding to the bottom-left diagonal direction, apply position dependent intra prediction combination to the first reference samples to determine the first modified reference samples.

13. The device of claim 8, wherein the device comprises a wireless communication device, further comprising a receiver configured to receive encoded video data.

14. The device of claim 13, wherein the wireless communication device comprises a telephone handset and wherein the receiver is configured to demodulate, according to a wireless communication standard, a signal comprising the encoded video data.

15. The device of claim 8, further comprising:
a display configured to display decoded video data.

16. The device of claim 8, wherein the device comprises one or more of a camera, a computer, a mobile device, a broadcast receiver device, or a set-top box.

17. The device of claim 8, wherein the device comprises a device for encoding video data.

18. The device of claim 8, wherein the one or more processors are further configured to:
determine values for wL, wT, and wTL based on the first aspect ratio of the first block not being equal to one, wherein wL, wT, and wTL comprise the first weights, and wherein to apply the first weights according to the position dependent intra prediction combination mode to the first reference samples to determine modified reference samples, the one or more processors are further configured to apply the first weights according to the following equation:

$$\text{mod\_pred}(x,y) = (wL \times R_{-1,y} + wT \times R_{x,-1} - wTL \times R_{-1,-1} + (64 - wL - wT + wTL) \times \text{pred}(x,y) + 32) >> 6$$

wherein mod_pred(x,y) represents a modified prediction values for current sample (x,y), pred(x,y) represents a prediction value for the current sample (x,y), $R_{x,-1}$ and $R_{-1,y}$ represent reference samples located at a top and left of current sample (x,y), respectively, and $R_{-1,-1}$ represents a reference sample located at a top-left corner of the first block.

19. A non-transitory computer-readable storage medium storing instructions that when executed by one or more processors cause the one or more processors to:
determine a first block of video data is intra predicted using a first angular intra prediction mode, wherein the first angular intra prediction mode is one of a bottom-left intra prediction mode or a top-right intra prediction mode, wherein the first block of video data comprises a first non-square block of video data;
locate one or more first reference samples corresponding to the first angular intra prediction mode;
determine that a first aspect ratio of the first block is not equal to one;
determine values for first weights based on the first aspect ratio of the first block not being equal to one;
apply the first weights according to a position dependent intra prediction combination mode to the first reference samples to determine first modified reference samples;
generate a first predictive block for the first block based on the first modified reference samples;

determine a second block of the video data is intra predicted using a second angular intra prediction mode, wherein the second block of video data comprises a second non-square block of video data;
locate one or more second reference samples corresponding to the second angular intra prediction mode;
determine that a second aspect ratio of the second block is not equal to one and is different than the first aspect ratio of the first block;
determine second values for second weights based on the second aspect ratio of the second block not being equal to one;
apply the second weights according to the position dependent intra prediction combination mode to the second reference samples to determine second modified reference samples based on the second aspect ratio of the second block, wherein the second weights are different than the first weights; and
generate a second predictive block for the second block based on the second modified reference samples.

20. The non-transitory computer-readable storage medium of claim 19, wherein to apply the first weights according to the position dependent intra prediction combination mode to the first reference samples to determine the first modified reference samples, the instructions cause the one or more processors to:
based on the first aspect ratio of the first block, determine a top-right diagonal direction for the first block; and
in response to the first angular intra prediction mode corresponding to the top-right diagonal direction for the first block, apply position dependent intra prediction combination to the first reference samples to determine the first modified reference samples.

21. The non-transitory computer-readable storage medium of claim 19, wherein to apply the first weights according to the position dependent intra prediction combination mode to the first reference samples to determine the first modified reference samples, the instructions cause the one or more processors to:
based on the first aspect ratio of the first block, determine a bottom-left diagonal direction for the first block; and
in response to the first angular intra prediction mode corresponding to the bottom-left diagonal direction for the first block, apply position dependent intra prediction combination to the first reference samples to determine the first modified reference samples.

22. The non-transitory computer-readable storage medium of claim 19, wherein to apply the first weights according to the position dependent intra prediction combination mode to the first reference samples to determine the first modified reference samples, the instructions cause the one or more processors to:
based on the first aspect ratio of the first block, determine a top-right diagonal direction for the first block; and
in response to a mode index for the first angular intra prediction mode being within a threshold value of a mode index for an intra prediction mode corresponding to the top-right diagonal direction, apply position dependent intra prediction combination to the first reference samples to determine the first modified reference samples.

23. The non-transitory computer-readable storage medium of claim 19, wherein to apply the first weights according to the position dependent intra prediction combination mode to the first reference samples to determine the first modified reference samples, the instructions cause the one or more processors to:

based on the first aspect ratio of the first block, determine a bottom-left diagonal direction for the first block; and in response to a mode index for the first angular intra prediction mode being within a threshold value of a mode index for an intra prediction mode corresponding to the bottom-left diagonal direction, apply position dependent intra prediction combination to the first reference samples to determine the first modified reference samples.

24. An apparatus for decoding video data, the apparatus comprising:

means for determining a first block of video data is intra predicted using a first angular intra prediction mode, wherein the first angular intra prediction mode is one of a bottom-left intra prediction mode or a top-right intra prediction mode, wherein the first block of video data comprises a first non-square block of video data;

means for locating one or more first reference samples corresponding to the first angular intra prediction mode;

means for determining that a first aspect ratio of the first block is not equal to one;

means for determining values for first weights based on the first aspect ratio of the first block not being equal to one;

means for applying the first weights according to a position dependent intra prediction combination mode to the first reference samples to determine first modified reference samples;

means for generating a first predictive block for the first block based on the first modified reference samples;

means for determining a second block of the video data is intra predicted using a second angular intra prediction mode, wherein the second block of video data comprises a second non-square block of video data;

means for locating one or more second reference samples corresponding to the second angular intra prediction mode;

means for determining that a second aspect ratio of the second block is not equal to one and is different than the first aspect ratio of the first block;

means for determining second values for second weights based on the second aspect ratio of the second block not being equal to one;

means for applying the second weights according to the position dependent intra prediction combination mode to the second reference samples to determine second modified reference samples based on the second aspect ratio of the second block, wherein the second weights are different than the first weights; and means for generating a second predictive block for the second block based on the second modified reference samples.

25. The apparatus of claim 24, wherein the means for applying the first weights according to the position dependent intra prediction combination mode to the first reference samples to determine the first modified reference samples comprises:

means for determining a top-right diagonal direction for the first block based on the first aspect ratio of the first block; and means for applying position dependent intra prediction combination to the first reference samples to determine the first modified reference samples in response to the first angular intra prediction mode corresponding to the top-right diagonal direction for the first block.

26. The apparatus of claim 24, wherein the means for applying the first weights according to the position dependent intra prediction combination mode to the first reference samples to determine the first modified reference samples comprises:

means for determining a bottom-left diagonal direction for the first block based on the first aspect ratio of the first block; and means for applying position dependent intra prediction combination to the first reference samples to determine the first modified reference samples in response to the first angular intra prediction mode corresponding to the bottom-left diagonal direction for the first block.

27. The apparatus of claim 24, wherein the means for applying the first weights according to the position dependent intra prediction combination mode to the first reference samples to determine the first modified reference samples comprises:

means for determining a top-right diagonal direction for the first block based on the first aspect ratio of the first block; and means for applying position dependent intra prediction combination to the first reference samples to determine the first modified reference samples in response to a mode index for the first angular intra prediction mode being within a threshold value of a mode index for an intra prediction mode corresponding to the top-right diagonal direction.

28. The apparatus of claim 24, wherein the means for applying the first weights according to the position dependent intra prediction combination mode to the first reference samples to determine the first modified reference samples comprises:

means for determining a bottom-left diagonal direction for the first block based on the first aspect ratio of the first block; and means for applying position dependent intra prediction combination to the first reference samples to determine the first modified reference samples in response to a mode index for the first angular intra prediction mode being within a threshold value of a mode index for an intra prediction mode corresponding to the bottom-left diagonal direction.

* * * * *